United States Patent
Higashimori et al.

(10) Patent No.: US 11,085,461 B2
(45) Date of Patent: Aug. 10, 2021

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Hirotaka Higashimori, Hiroshima (JP); Tadashi Kanzaka, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 97 days.

(21) Appl. No.: 16/334,982

(22) PCT Filed: Nov. 27, 2017

(86) PCT No.: PCT/JP2017/042399
§ 371 (c)(1),
(2) Date: Mar. 20, 2019

(87) PCT Pub. No.: WO2018/105423
PCT Pub. Date: Jun. 14, 2018

(65) Prior Publication Data
US 2019/0264705 A1    Aug. 29, 2019

(30) Foreign Application Priority Data

Dec. 7, 2016  (JP) .............................. JP2016-237648

(51) Int. Cl.
| F04D 29/44 | (2006.01) |
| F02B 39/00 | (2006.01) |
| F04D 17/10 | (2006.01) |
| F04D 25/04 | (2006.01) |
| F02C 6/12 | (2006.01) |

(52) U.S. Cl.
CPC ............ *F04D 29/444* (2013.01); *F02B 39/00* (2013.01); *F02C 6/12* (2013.01); *F04D 17/10* (2013.01);
(Continued)

(58) Field of Classification Search
CPC ........ F04D 29/44; F04D 29/444; F04D 29/46; F04D 29/667; F04D 29/68; F04D 29/681; F02C 6/12
See application file for complete search history.

(56) References Cited

U.S. PATENT DOCUMENTS 3,936,223 A * 2/1976 Baghdadi ................ F04D 21/00
                                                            415/208.4
6,651,431 B1 * 11/2003 Yang ........................ F01D 9/026
                                                            60/605.1
(Continued)

FOREIGN PATENT DOCUMENTS

EP    2 055 964 A1    5/2009
GB       2412695 A  * 10/2005 ........... F04D 29/444
(Continued)

OTHER PUBLICATIONS

Office Action dated Apr. 22, 2020 issued in counterpart Chinese Application No. 201780049848.5 with an English Translation.
(Continued)

*Primary Examiner* — Brian P Wolcott
(74) *Attorney, Agent, or Firm* — Birch, Stewart, Kolasch & Birch, LLP

(57) ABSTRACT

A centrifugal compressor includes an impeller, a diffuser flow passage forming portion forming an annular diffuser flow passage on a downstream side of the impeller, a plurality of small chord-pitch ratio diffuser blades disposed in the diffuser flow passage at intervals in a circumferential direction of the impeller, and a flow passage dividing annulus extending to the diffuser flow passage along a radial direction of the impeller, and dividing the diffuser flow passage into a hub-side flow passage and a shroud-side flow passage.

15 Claims, 22 Drawing Sheets

(52) U.S. Cl.
CPC ........ *F04D 25/04* (2013.01); *F05B 2240/123* (2013.01); *F05D 2220/40* (2013.01); *F05D 2250/52* (2013.01)

(56) References Cited

U.S. PATENT DOCUMENTS

| | | | |
|---|---|---|---|
| 9,121,408 B2 * | 9/2015 | Shioda | .................... F04D 17/08 |
| 2010/0129204 A1 | 5/2010 | Higashimori et al. | |
| 2013/0094955 A1 | 4/2013 | Ibaraki et al. | |

FOREIGN PATENT DOCUMENTS

| | | | |
|---|---|---|---|
| GB | 2 412 695 A | 5/2009 |
| JP | 60-184998 A | 9/1985 |
| JP | 60-184999 A | 9/1985 |
| JP | 2012-107629 A | 6/2012 |
| WO | WO 2008/053605 A1 | 5/2008 |

OTHER PUBLICATIONS

Extended European Search Report effective Aug. 13, 2019 issued in the corresponding EP Application No. 17878735.4.
International Search Report dated Feb. 27, 2018 issued in corresponding International Application No. PCT/JP2017/042399.
Written Opinion of the International Searching Authority dated Apr. 11, 2019 in corresponding International Application No. PCT/JP2017/042399.
Office Action dated Feb. 12, 2020 issued in the corresponding Japanese Application No. 2016-237648 with a Machine Translation.

* cited by examiner

Upstream side ← → Downstream side
Axial direction of impeller

Upstream side ← → Downstream side
Axial direction of impeller

Upstream side ← → Downstream side

Axial direction of impeller

CENTRIFUGAL COMPRESSOR AND TURBOCHARGER

TECHNICAL FIELD

The present disclosure relates to a centrifugal compressor and a turbocharger.

BACKGROUND

A centrifugal compressor generally includes diffusers on a downstream side of an impeller. The diffusers are classified into vaned diffusers with diffuser blades (vanes) and vaneless diffusers without any vanes.

The vaned diffusers are classified into a small chord-pitch ratio diffuser and a normal vaned diffuser.

FIG. 22 is a meridional view showing a schematic configuration of a typical centrifugal compressor with a vaned diffuser. FIG. 23 is a front view partially showing an arrangement of an internal configuration of the typical centrifugal compressor. In each of FIGS. 22 and 23, small chord-pitch ratio diffuser blades and normal vaned diffuser blades to be described below are described in the same view for the sake of descriptive convenience.

As shown in the second quadrant of FIG. 23, the "small chord-pitch ratio diffuser" refers to a vaned diffuser which includes blades (to be referred to as "small chord-pitch ratio diffuser blades" hereinafter) configured such that a ratio H/I of a distance H between a leading edge and trailing edge of the same blade to a circumferential distance I (a distance on a circumference about a rotational center of an impeller) between leading edges of adjacent blades is in the neighborhood of about 1 and less than 1, or 1.5 or less at most, that is, the ratio H/I is 1.5 or less. Normal small chord-pitch ratio diffuser blades are configured so as to satisfy H/I<1, and thus no throat is formed between adjacent small chord-pitch ratio diffuser blades.

In addition, the "normal vaned diffuser" refers to a vaned diffuser other than the small chord-pitch ratio diffuser. That is, as shown in the first quadrant of FIG. 23, the "normal vaned diffuser" refers to a vaned diffuser which includes blades (to be referred to as the "normal vaned diffuser blades" hereinafter) configured such that the above ratio H/I is sufficiently greater than 1 and is at least 1.5 or more. The normal vaned diffuser blades are configured so as to satisfy H/I≥1, and thus a throat S is formed between adjacent normal vaned diffuser blades as shown in FIG. 23.

Patent Document 1 discloses a centrifugal compressor including a normal vaned diffuser. In the centrifugal compressor according to Patent Document 1, a diffuser flow passage is divided into halves in a flow-passage width direction by a disc-shaped partition plate, and a plurality of guide blades are disposed in the respective divided flow passages, the guide vanes each having an inlet vane angle equal to an average flow angle of the respective flow passages. In this way, an incidence loss in an inlet portion of a vaned diffuser is reduced, and the secondary flow loss in the diffuser is to be reduced.

CITATION LIST

Patent Literature

Patent Document 1: JPS60-184999A

SUMMARY

Technical Problem

FIG. 24 shows a flow-rate pressure characteristic of a centrifugal compressor with a vaneless diffuser, a flow-rate pressure characteristic of a centrifugal compressor with a normal vaned diffuser, and a flow-rate pressure characteristic of a centrifugal compressor with small chord-pitch ratio diffuser blades by a dashed line, a solid line, and a single-dotted chain line, respectively. In addition, FIG. 25 shows a flow-rate efficiency characteristic of the centrifugal compressor with the vaneless diffuser, a flow-rate efficiency characteristic of the centrifugal compressor with the normal vaned diffuser, and the flow-rate pressure characteristic of the centrifugal compressor with the small chord-pitch ratio diffuser blades by a dashed line, a solid line, and a single-dotted chain line, respectively.

In general, the centrifugal compressor with the vanless diffuser has a low surge flow rate and a high choke flow rate as shown in FIGS. 24 and 25, and is thus characterized by low efficiency even though the centrifugal compressor with the vanless diffuser can be operated over a wide flow-rate range.

On the other hand, the centrifugal compressor with the normal vaned diffuser has a higher surge flow rate and a lower choke flow rate than the centrifugal compressor with the vaneless diffuser as shown in FIGS. 24 and 25, and is thus characterized by high efficiency even though an operable flow-rate range thereof is narrow.

In contrast, the centrifugal compressor with a small chord-pitch ratio diffuser represents an intermediate characteristic between the centrifugal compressor with the vaneless diffuser and the centrifugal compressor with the normal vaned diffuser as shown in FIGS. 24 and 25 because no throat is formed between the small chord-pitch ratio diffuser blades as described above. The centrifugal compressor with the small chord-pitch ratio diffuser has a higher choke flow rate than the normal vaned diffuser and a lower surge flow rate than the normal vaned diffuser, and thus has a wider operable flow-rate range than the normal vaned diffuser. Moreover, the small chord-pitch ratio diffuser is characterized by increasing efficiency because a pressure recovery ratio thereof is higher than that of the vaneless diffuser as shown in FIGS. 24 and 25. However, a further improvement in efficiency is desired. In this regard, Patent Document 1 does not disclose any findings for improving efficiency in the small chord-pitch ratio diffuser.

At least one embodiment of the present invention was made in view of the above conventional problem. An object of at least one embodiment of the present invention is to relate to a centrifugal compressor including small chord-pitch ratio diffuser blades, and to provide a highly efficient centrifugal compressor and a turbocharger including the same.

Solution to Problem (1) A centrifugal compressor according to at least one embodiment of the present invention includes an impeller, a diffuser flow passage forming portion forming an annular diffuser flow passage on a downstream side of the impeller, a plurality of small chord-pitch ratio diffuser blades disposed in the diffuser flow passage at intervals in a circumferential direction of the impeller, and a flow passage dividing annulus extending to the diffuser flow passage along a radial direction of the impeller, and dividing the diffuser flow passage into a hub-side flow passage and a shroud-side flow passage.

With the centrifugal compressor according to the above (1), disposing the flow passage dividing annulus, it is possible to reduce a flow-passage area of a section of the diffuser flow passage where the flow passage dividing annulus exists. Thus, it is possible to suppress a development in boundary layer along wall surfaces of the diffuser flow passage forming portion (a hub-side flow passage wall surface and a shroud-side flow passage wall surface in the diffuser flow passage).

In addition, in the above centrifugal compressor, a boundary layer formed along a suction surface of each of the small chord-pitch ratio diffuser blades moves from the suction surface of each of the small chord-pitch ratio diffuser blades to a wall surface of the flow passage dividing annulus from the proximity of the center to downstream of a chord length on the suction surface, and flows inward in a radial direction along the wall surface of the flow passage dividing annulus. That is, an action is produced such that the boundary layer along the suction surface of each of the small chord-pitch ratio diffuser blades is sucked out from the suction surface toward the wall surface of the flow passage dividing annulus. Thus, it is possible to suppress the development in boundary layer along the suction surface of each of the small chord-pitch ratio diffuser blades more effectively than a typical small chord-pitch ratio diffuser without a flow passage dividing annulus. It is therefore possible to implement a highly efficient centrifugal compressor by effectively making a force applied to a flow as a counteraction of a lift of a small chord-pitch ratio blade work and resulting in increasing a pressure recovery ratio in the diffuser flow passage.

(2) In some embodiments, in the centrifugal compressor according to the above (1), the small chord-pitch ratio diffuser blades extend in an axial direction of the impeller from the hub-side flow passage to the shroud-side flow passage so as to intersect with the flow passage dividing annulus.

With the centrifugal compressor according to the above (2), an action is produced such that the boundary layer on the suction surface of each of the small chord-pitch ratio diffuser blades is sucked out to four wall surfaces in total, namely, two wall surfaces of the diffuser flow passage forming portion (a hub-side flow passage wall surface and a shroud-side flow passage wall surface in the diffuser flow passage), a wall surface, which faces a hub-side flow passage, of the flow passage dividing annulus, and a wall surface, which faces a shroud-side flow passage, of the flow passage dividing annulus. Thus, it is possible to suppress the development in boundary layer along the suction surface of each of the small chord-pitch ratio diffuser blades more effectively than a typical small chord-pitch ratio diffuser without a flow passage dividing annulus. It is therefore possible to implement the highly efficient centrifugal compressor by effectively making the effect of the lift of the small chord-pitch ratio vane work and resulting in increasing the pressure recovery ratio in the diffuser flow passage.

(3) In some embodiments, in the centrifugal compressor according to the above (2), a blade angle at each leading edge of the small chord-pitch ratio diffuser blades is uniform from a hub-side end to a shroud-side end of the leading edge in the axial direction.

With the centrifugal compressor according to the above (3), in a simple configuration in which the blade angle at each leading edge of the small chord-pitch ratio diffuser blades is uniform, it is possible to implement a highly efficient centrifugal compressor by increasing the pressure recovery ratio in the diffuser flow passage.

(4) In some embodiments, in the centrifugal compressor according to any one of the above (1) to (3), the flow passage dividing annulus is formed integrally with the plurality of small chord-pitch ratio diffuser blades, the small chord-pitch ratio diffuser blades each include a diffuser-vane-side engagement portion which engages with a flow-passage-wall-side engagement portion disposed on the diffuser flow passage forming portion, and the diffuser-vane-side engagement portion engages with the flow-passage-wall-side engagement portion so that the flow passage dividing annulus is held in the diffuser flow passage.

With the centrifugal compressor according to the above (4), it is possible to configure the flow passage dividing annulus and the plurality of small chord-pitch ratio diffuser blades by one component. Moreover, engaging the diffuser-vane-side engagement portion with the flow-passage-wall-side engagement portion, it is possible to fix the one component coaxially with a rotational shaft of the impeller, the one component including the flow passage dividing annulus and the plurality of small chord-pitch ratio diffuser blades.

(5) In some embodiments, in the centrifugal compressor according to any one of the above (1) to (4), the flow passage dividing annulus is formed so as to satisfy $ZSi/ZHi>ZSo/ZHo$, where $ZSi$ is a flow-passage width of the shroud-side flow passage in an axial direction of the impeller at a position of a radially inner end of the flow passage dividing annulus, $ZHi$ is a flow-passage width of the hub-side flow passage in the axial direction at the position of the radially inner end of the flow passage dividing annulus, $ZSo$ is a flow-passage width of the shroud-side flow passage in the axial direction at a position of a radially outer end of the flow passage dividing annulus, and $ZHo$ is a flow-passage width of the hub-side flow passage in the axial direction at the position of the radially outer end of the flow passage dividing annulus.

In the vicinity of an inlet of the diffuser flow passage, a flow velocity and a flow rate are higher on a hub side than on a shroud side. Therefore, the flow passage dividing annulus is configured so as to satisfy $ZSi/ZHi>ZSo/ZHo$ as described in the above (5), thereby decreasing the ratio of the flow-passage width of the shroud-side flow passage to the flow-passage width of the hub-side flow passage while passing through the flow passage dividing annulus. It is thus possible to uniform a flow-velocity distribution at an outlet of the flow passage dividing annulus by reducing a difference in flow velocity between the hub-side flow passage and the shroud-side flow passage. Thus, it is possible to implement the highly efficient centrifugal compressor by effectively suppressing an increase in loss in the diffuser flow passage and increasing the pressure recovery ratio in the diffuser flow passage.

(6) In some embodiments, in the centrifugal compressor according to any one of the above (1) to (5), a radially inner end of the flow passage dividing annulus is positioned inside of leading edges of the small chord-pitch ratio diffuser blades in the radial direction.

With the centrifugal compressor according to the above (6), it is possible to implement the highly efficient centrifugal compressor by increasing the pressure recovery ratio in the diffuser flow passage.

(7) In some embodiments, in the centrifugal compressor according to any one of the above (1) to (5), the radially inner end of the flow passage dividing annulus is positioned outside of leading edges of the small chord-pitch ratio diffuser blades in the radial direction.

With the centrifugal compressor according to the above (7), it is possible to implement the highly efficient centrifugal compressor by increasing the pressure recovery ratio in the diffuser flow passage.

(8) In some embodiments, in the centrifugal compressor according to any one of the above (1) to (7), the radially outer end of the flow passage dividing annulus is positioned inside of trailing edges of the small chord-pitch ratio diffuser blades in the radial direction.

With the centrifugal compressor according to the above (8), it is possible to implement the highly efficient centrifugal compressor by increasing the pressure recovery ratio in the diffuser flow passage.

(9) In some embodiments, in the centrifugal compressor according to any one of the above (1) to (7), the radially outer end of the flow passage dividing annulus is positioned outside of trailing edges of the small chord-pitch ratio diffuser blades in the radial direction.

With the centrifugal compressor according to the above (9), it is possible to implement the highly efficient centrifugal compressor by increasing the pressure recovery ratio in the diffuser flow passage.

(10) In some embodiments, in the centrifugal compressor according to any one of the above (1) to (9), a radially-inner-side end portion including the radially inner end of the flow passage dividing annulus is formed such that a thickness in an axial direction of the impeller increases outward in the radial direction.

With the centrifugal compressor according to the above (10), it is possible to suppress an increase in loss caused by a collision of a flow of the diffuser flow passage with the radially-inner-side end portion of the flow passage dividing annulus.

(11) In some embodiments, in the centrifugal compressor according to any one of the above (1) to (10), a radially-outer-side end portion including the radially outer end of the flow passage dividing annulus is formed such that a thickness in an axial direction of the impeller increases inward in the radial direction.

With the centrifugal compressor according to the above (11), it is possible to suppress an increase in loss in the vicinity of the radially outer end of the flow passage dividing annulus by smoothly merging a flow of the hub-side flow passage and a flow of the shroud-side flow passage with each other.

(12) In some embodiments, in the centrifugal compressor according to any one of the above (1) to (11), a flow-passage width of the hub-side flow passage in at least a partial section including a position of the radially inner end in an axial direction of the impeller decreases toward a downstream side.

With the centrifugal compressor according to the above (12), in the section, it is possible to reduce a thickness of the boundary layer along the hub-side flow passage wall toward the downstream side. It is also possible to make a flow velocity at an outlet position of the hub-side flow passage and a flow velocity at an outlet position of the shroud-side flow passage substantially equal to each other by appropriately adjusting flow-passage widths of the hub-side flow passage and shroud-side flow passage.

(13) In some embodiments, in the centrifugal compressor according to any one of the above (1) to (12), a flow-passage width of the shroud-side flow passage in at least a partial section including a position of the radially inner end in an axial direction of the impeller decreases toward a downstream side.

With the centrifugal compressor according to the above (13), in the section, it is possible to reduce a thickness of the boundary layer along the wall surface of the shroud-side flow passage wall portion toward the downstream side. It is also possible to make a flow velocity at an outlet position of the hub-side flow passage and a flow velocity at an outlet position of the shroud-side flow passage substantially equal to each other by appropriately adjusting flow-passage widths of the hub-side flow passage and shroud-side flow passage.

(14) A turbocharger according to at least one embodiment of the present invention includes the centrifugal compressor according to any one of the above (1) to (13).

With the turbocharger according to the above (14), the turbocharger includes the centrifugal compressor according to any one of the above (1) to (13), making it possible to provide a highly efficient turbocharger.

Advantageous Effects

According to at least one embodiment of the present invention, related to is a centrifugal compressor including small chord-pitch ratio diffuser blades, and provided is a highly efficient centrifugal compressor and a turbocharger including the same.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
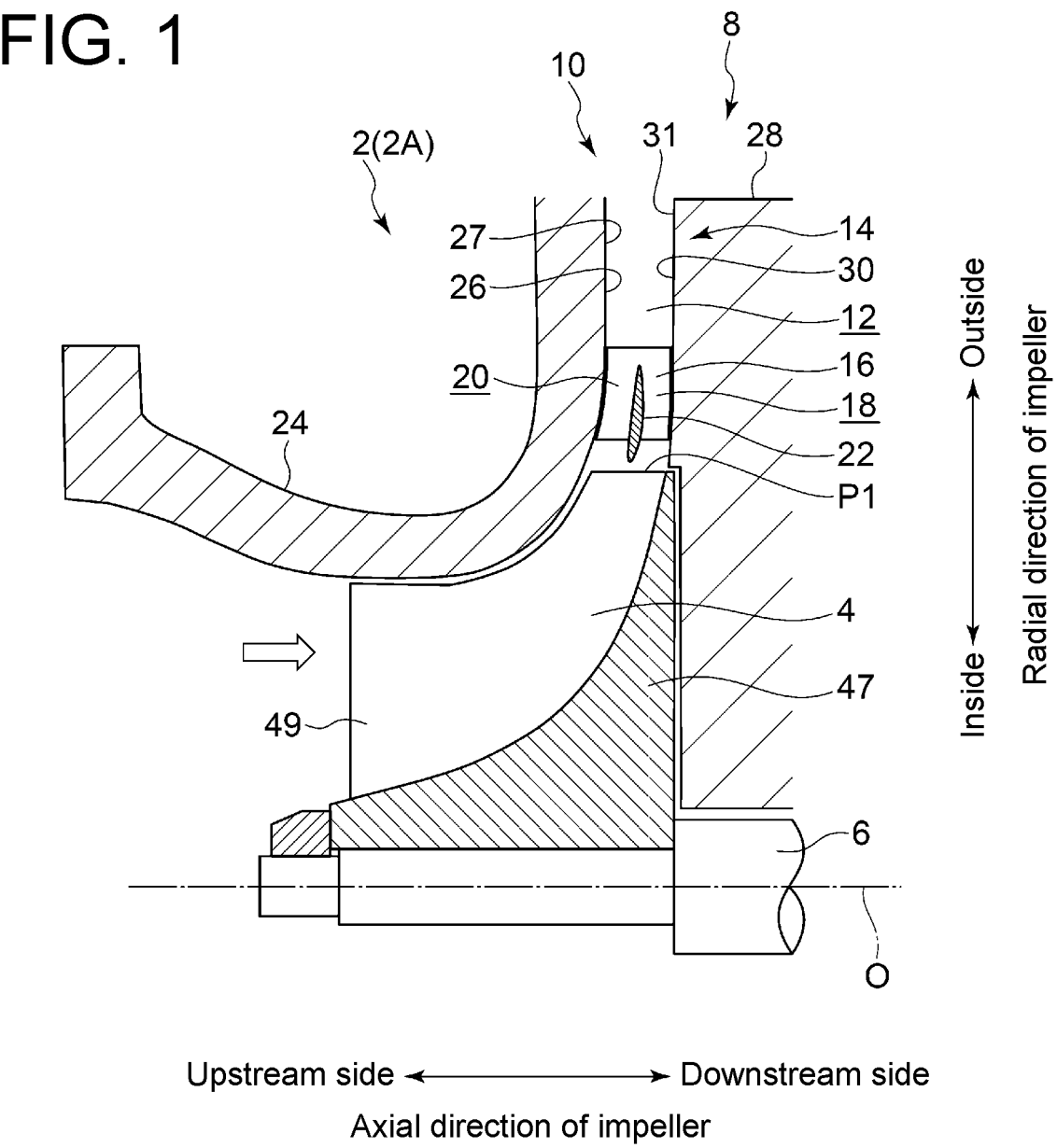
FIG. 1 is a meridional view of a part of a centrifugal compressor 2 (2A) according to an embodiment.
Figure 2:
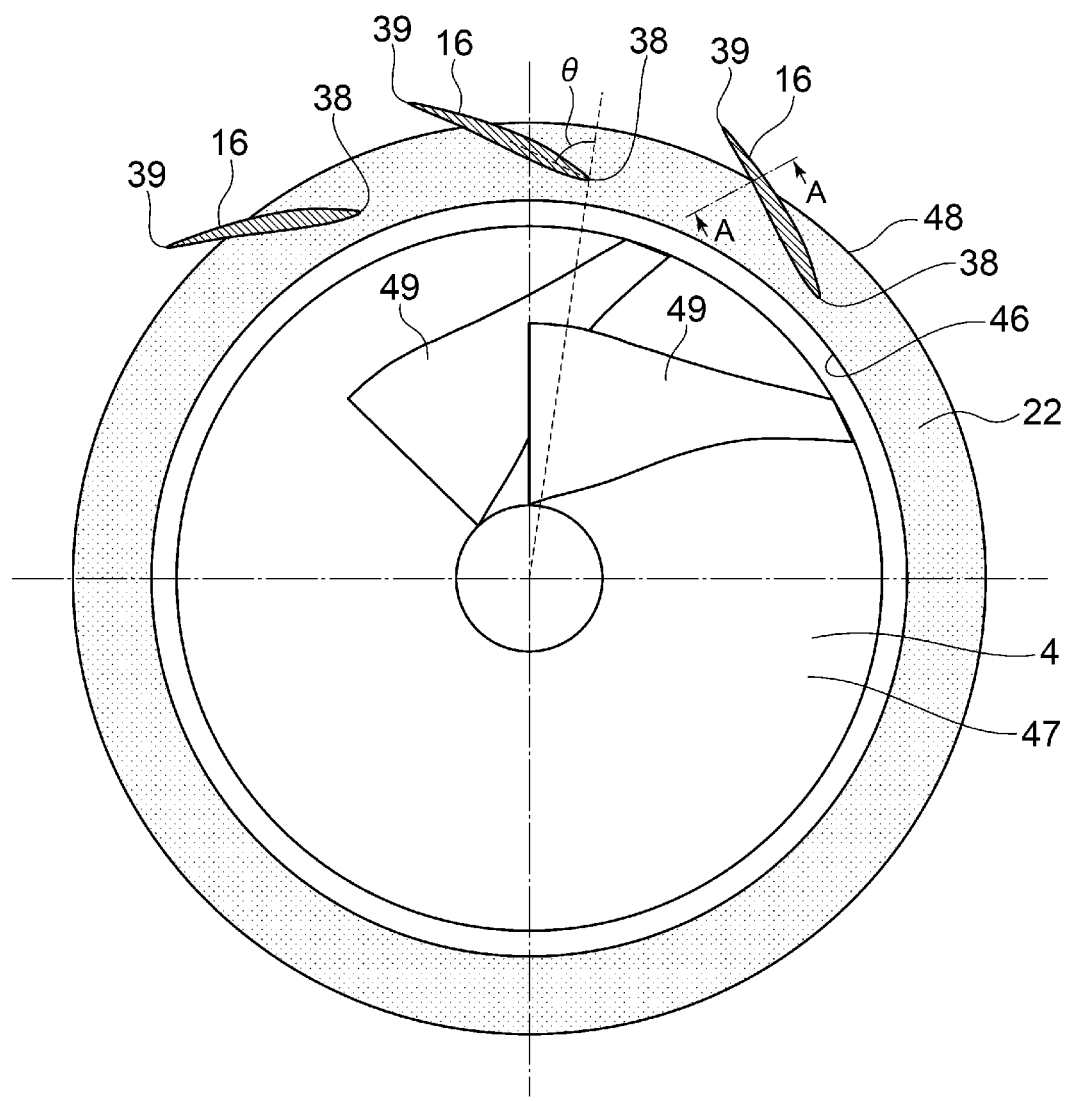
FIG. 2 is a schematic view partially showing an arrangement example of an internal configuration of the centrifugal compressor 2 (2A), as seen from an upstream side along a rotational axis O of an impeller 4.

FIG. 1 is a meridional view of a part of a centrifugal compressor 2 (2A) according to an embodiment. FIG. 2 is a schematic view partially showing an arrangement of an internal configuration of the centrifugal compressor 2 (2A), as seen from an upstream side along a rotational axis O of an impeller 4. The impeller 4 of the centrifugal compressor 2 is coupled to a turbine rotor of a turbine (not shown) via a rotational shaft 6. The centrifugal compressor 2 and the turbine (not shown) constitute a turbocharger 8.

As shown in at least one of FIGS. 1 and 2, the centrifugal compressor 2 (2A) includes the impeller 4 and a small chord-pitch ratio diffuser 10. The impeller 4 includes a hub 47 and a plurality of impeller blades 49 erected on an outer peripheral surface of the hub 47. The small chord-pitch ratio diffuser 10 is disposed on a downstream side of the impeller 4. The small chord-pitch ratio diffuser 10 includes a diffuser flow passage forming portion 14, a plurality of small chord-pitch ratio diffuser blades 16, and a flow passage dividing annulus 22. The diffuser flow passage forming portion 14 forms an annular diffuser flow passage 12 on the downstream side of the impeller 4. The plurality of small chord-pitch ratio diffuser blades 16 are disposed in the diffuser flow passage 12 at intervals in a circumferential direction of the impeller 4. The flow passage dividing annulus 22 extends to the diffuser flow passage 12 along a radial direction of the impeller 4, and divides the diffuser flow passage 12 into a hub-side flow passage 18 and a shroud-side flow passage 20. The small chord-pitch ratio diffuser blades 16 extend in an axial direction of the impeller 4 from the hub-side flow passage 18 to the shroud-side flow passage 20 so as to intersect with the flow passage dividing annulus 22. A definition of the "small chord-pitch ratio diffuser" and the definition of each of the "small chord-pitch ratio diffuser blades" are as described in a column of the background art.

In the depicted embodiment, the diffuser flow passage 12 is disposed between an outlet position P1 of the impeller 4 and a scroll flow passage (not shown) formed on an outer peripheral side of the impeller 4. The diffuser flow passage forming portion 14 includes a flow-passage wall portion of a disc shape (to be referred to as a "shroud-side flow passage wall portion 26" hereinafter) of a shroud casing 24 accommodating the impeller 4, the flow-passage wall portion corresponding to a range outside of the outlet position P1 of the impeller 4 in a radial direction and inside of the scroll flow passage (not shown) in the radial direction, and a flow-passage wall portion of a disc shape (to be referred to as "hub-side flow passage wall portion 30" hereinafter) of a bearing casing 28 which accommodates a bearing device (not shown) supporting the rotational shaft 6 of the impeller 4, the flow-passage wall portion facing the shroud-side flow passage wall portion 26.

According to the centrifugal compressor 2 (2A), disposing the flow passage dividing annulus 22, it is possible to narrow a flow-passage width of a section of the diffuser flow passage 12 where the flow passage dividing annulus 22 exists. Thus it is possible to suppress a development in boundary layer along the shroud-side flow passage wall portion 26 and a development in boundary layer along the hub-side flow-passage wall portion 30.

In addition, according to the centrifugal compressor 2 (2A), disposing the flow passage dividing annulus 22, it is possible to implement the highly efficient centrifugal compressor 2 (2A) by effectively suppressing a development in boundary layer formed along a suction surface of each of the small chord-pitch ratio diffuser blades 16 and increasing a pressure recovery ratio in the diffuser flow passage 12.

Figure 3:
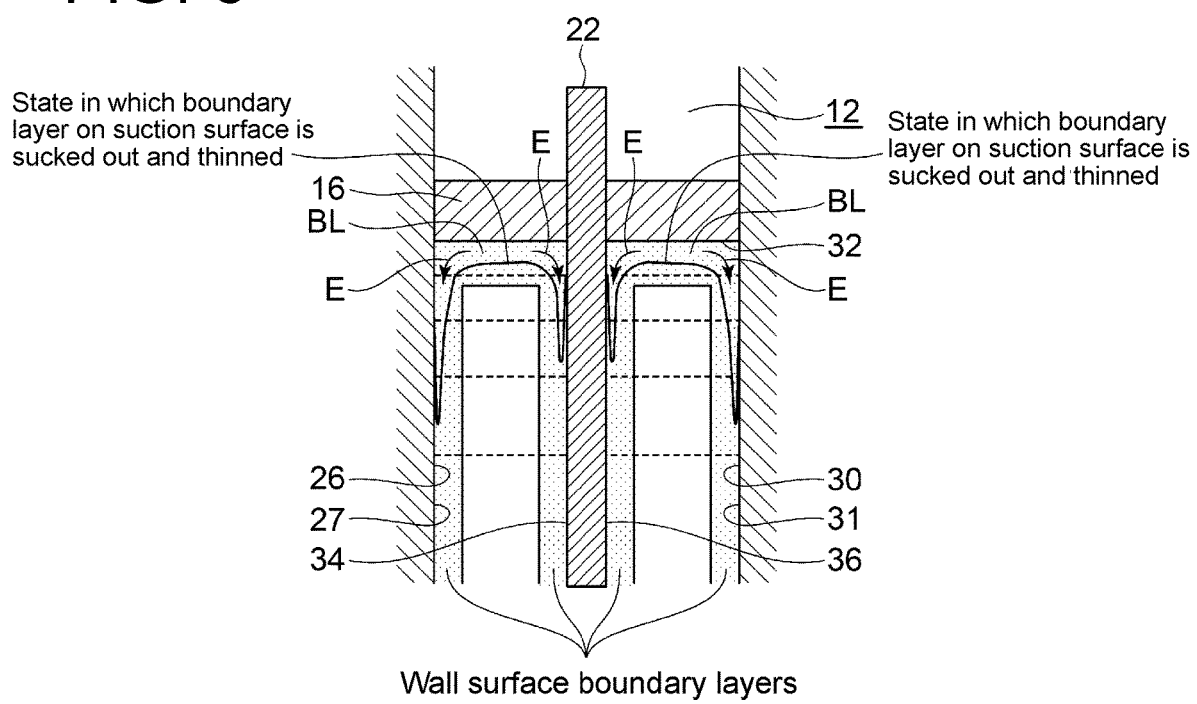
FIG. 3 is a view showing a state of each boundary layer of a diffuser flow passage 12 in the centrifugal compressor 2 (2A) (A-A view in FIG. 2).
Figure 23:
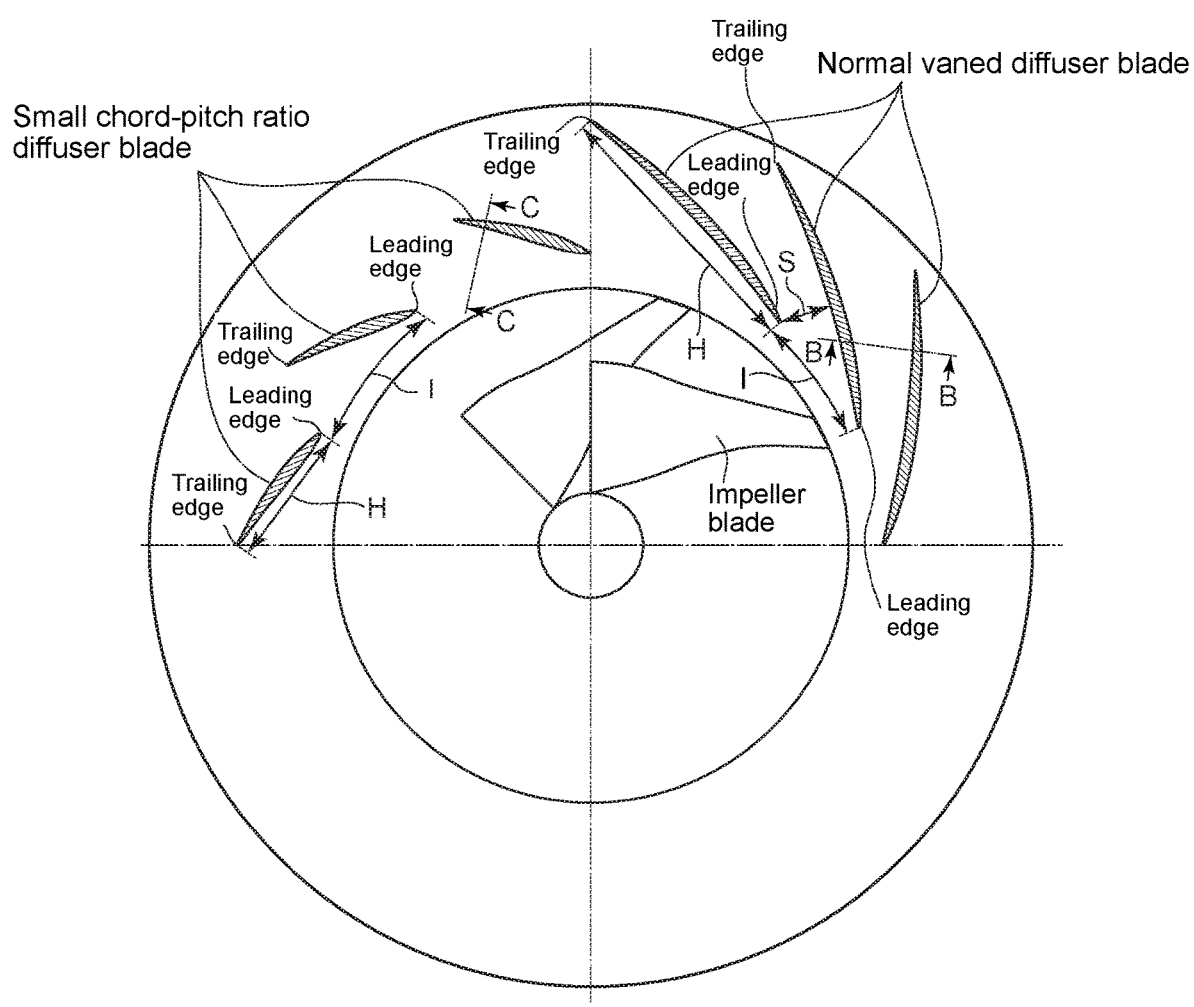
FIG. 23 is a front view partially showing an arrangement of an internal configuration of the typical centrifugal compressor.
Figure 24:
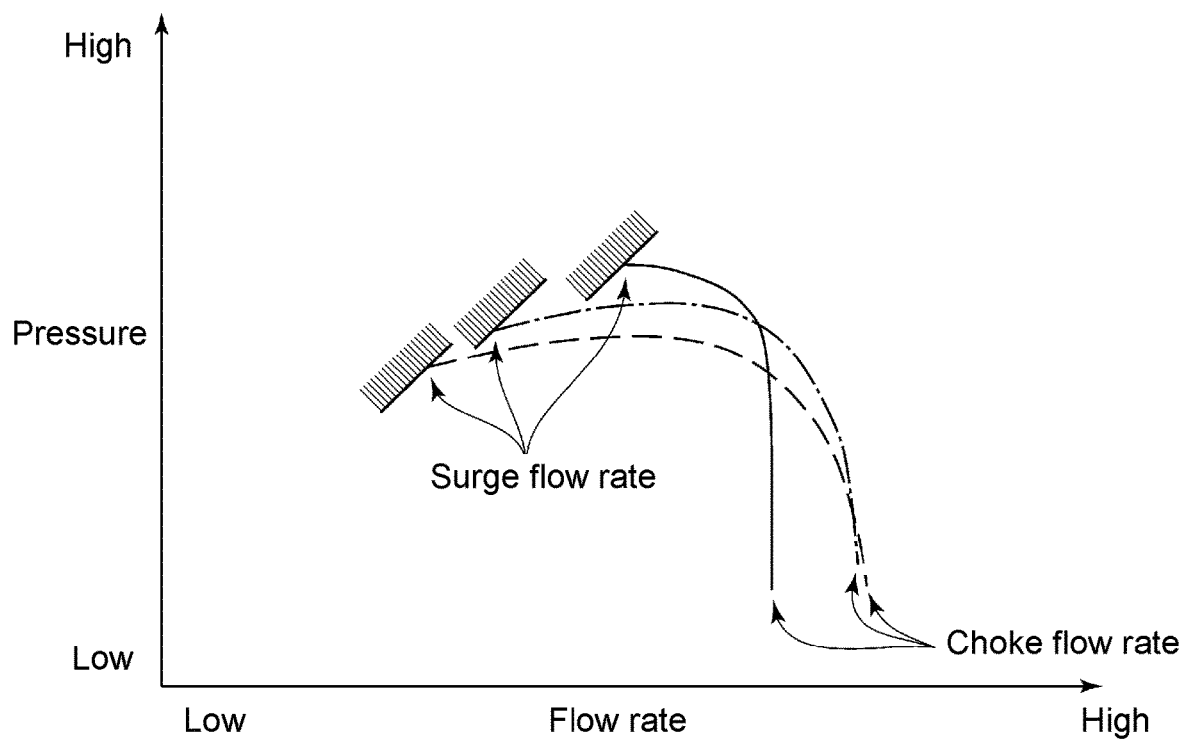
FIG. 24 is a graph showing a comparison in flow-rate pressure characteristics of a centrifugal compressor with a vaneless diffuser, centrifugal compressor with a normal vaned diffuser, and centrifugal compressor with a small chord-pitch ratio diffuser.
Figure 25:
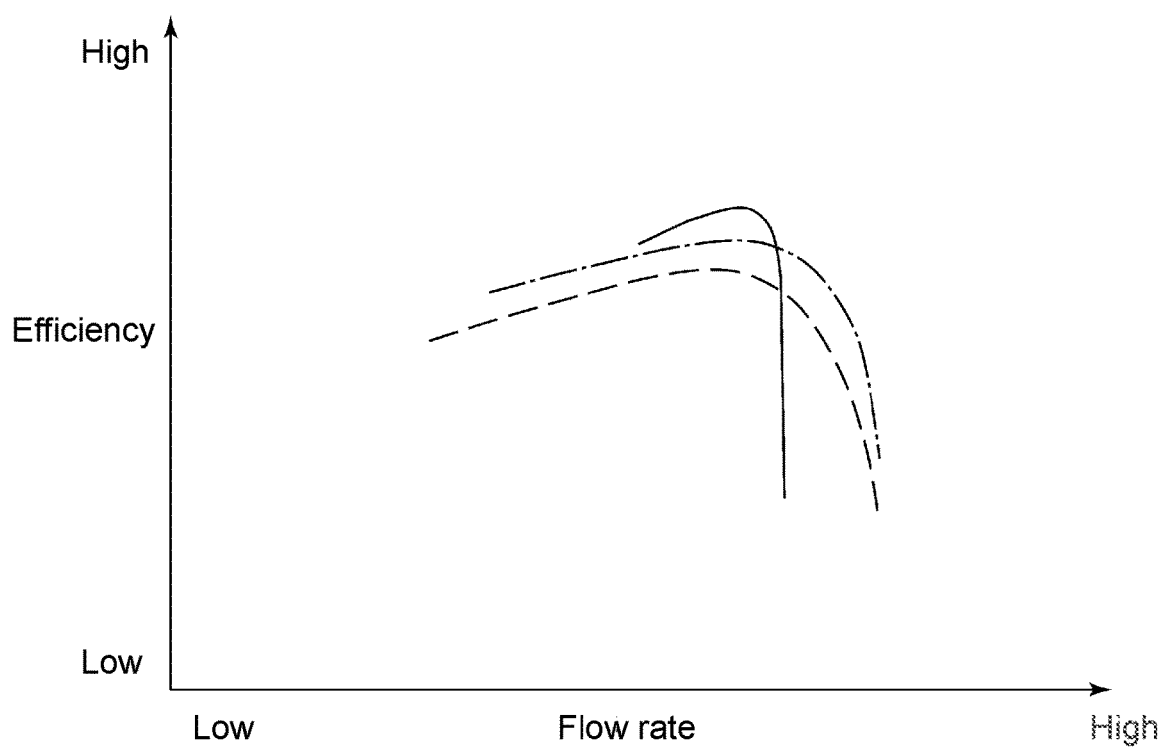
FIG. 25 is a graph showing a comparison in flow-rate efficiency characteristics of the centrifugal compressor with the vaneless diffuser, centrifugal compressor with the normal vaned diffuser, and centrifugal compressor with the small chord-pitch ratio diffuser.
Figure 26:
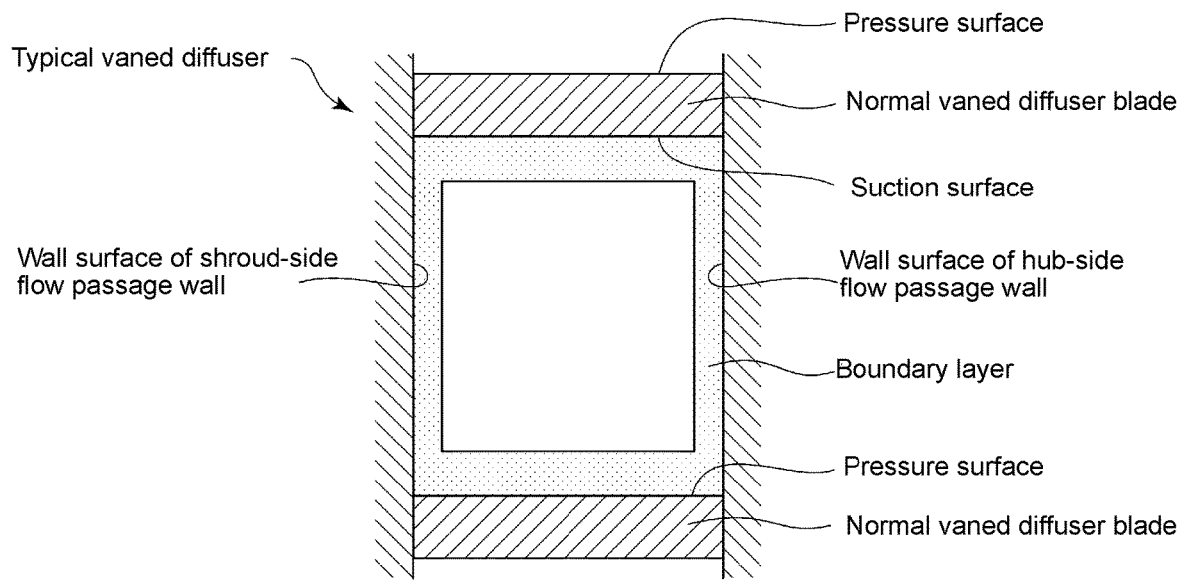
FIG. 26 is a view showing a state of a boundary layer of a diffuser flow passage in the typical centrifugal compressor which includes the normal vaned diffuser (B-B view in FIG. 23).
Figure 27:
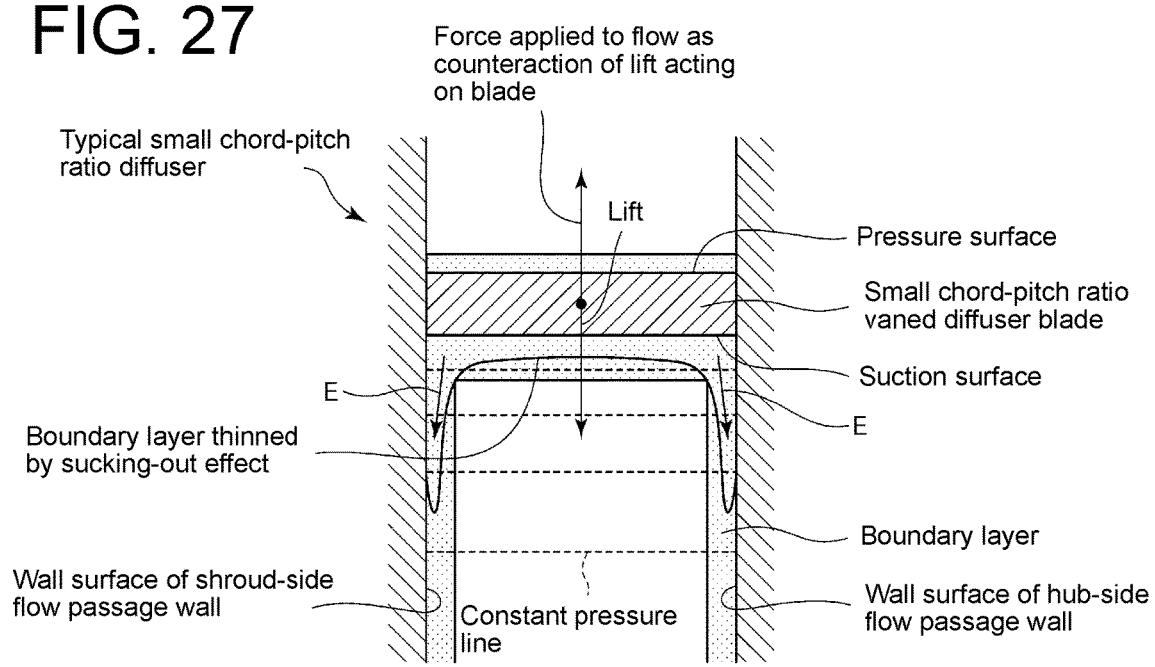
FIG. 27 is a view showing a state of a boundary layer of a diffuser flow passage in a typical centrifugal compressor which includes the small chord-pitch ratio diffuser but does not include a flow passage dividing annulus (C-C view in FIG. 23).

This effect will be described below with reference to FIGS. 3, 26, and 27. FIG. 3 is a view showing a state of each boundary layer of the diffuser flow passage 12 in the above centrifugal compressor 2 (2A) (A-A view in FIG. 2). FIG. 26 is a view showing a state of a boundary layer of a diffuser flow passage in a typical centrifugal compressor which includes a normal vaned diffuser (B-B view in FIG. 23). FIG. 27 is a view showing a state of a boundary layer of a diffuser flow passage in a typical centrifugal compressor which includes a small chord-pitch ratio diffuser but does not include a flow passage dividing annulus (C-C view in FIG. 23).

As shown in FIG. 26, in a typical vaned diffuser, there is almost no pressure gradient taken along line A-A between adjacent normal vaned diffuser blades, and the boundary layer develops substantially equally on a pressure surface of the normal vaned diffuser blade, a suction surface of the normal vaned diffuser blade, a wall surface of a shroud-side flow passage wall, and a wall surface of a hub-side flow passage wall.

On the other hand, as shown in FIG. 27, in a typical small chord-pitch ratio diffuser, no throat is formed between adjacent small chord-pitch ratio diffuser blades. Therefore, in the small chord-pitch ratio diffuser, a counteraction of a lift of a blade acts to increase a pressure of a flow radially outwardly and increase a pressure recovery ratio of the diffuser. Similarly to a general single blade, however, the boundary layer may be enlarged along a suction surface. However, while the single blade does not have a wall surface at a blade end, the small chord-pitch ratio diffuser has a diffuser wall surface connected to a blade suction surface. A distance from the rotational axis of the impeller decreases with distance from the suction surface of the small chord-pitch ratio diffuser blade along the diffuser wall surface taken along line B-B (see FIG. 23), decreasing a pressure. Accordingly, the boundary layer on the suction surface of the small chord-pitch ratio diffuser blade not only flows outward in the radial direction along the suction surface but also flows out from the higher side to lower side of pressure gradient along each of the wall surface of the shroud-side flow passage wall and the wall surface of the hub-side flow passage wall. That is, as indicated by arrows E, an action (may be referred to as a "sucking-out effect of the boundary layer" hereinafter) is produced such that the boundary layer along the suction surface is sucked out to the wall surface of the shroud-side flow passage wall and the wall surface of the hub-side flow passage wall. As a result, the boundary layer along the suction surface of the small chord-pitch ratio diffuser blade becomes smaller than the boundary layer along the suction surface of the vaned diffuser blade.

In contrast, as shown in FIG. 3, in the above centrifugal compressor 2(2A), boundary layers BL formed along a suction surface 32 of the small chord-pitch ratio diffuser blade 16 flow out from the higher side to lower side of pressure gradient along not only a wall suction surface 27 of the shroud-side flow passage wall portion 26 and a wall surface 31 of the hub-side flow-passage wall portion 30 but also wall surfaces 34 and 36 of the flow passage dividing annulus 22 (in FIG. 3, dashed lines indicating constant pressure lines and in a direction away from the suction surface 32 along the wall suction surfaces 27 and 31). That is, an action is exerted such that the boundary layers BL formed along the suction surface 32 are sucked out toward the four wall surfaces 27, 31, 34, and 36 as indicated by the arrows E. Thus, it is possible to suppress a development in boundary layers BL along the suction surface 32 of the small chord-pitch ratio diffuser blade 16 more effectively than the typical small chord-pitch ratio diffuser. It is therefore possible to implement the highly efficient centrifugal compressor 2 (2A) by effectively making a force applied to a flow as the counteraction of the lift of the small chord-pitch ratio diffuser blade 16 work and resulting in increasing the pressure recovery ratio in the diffuser flow passage 12.

In some embodiments, a blade angle θ at a leading edge 38 of the small chord-pitch ratio diffuser blade 16 shown in FIG. 2 (an angle formed by a camber line of the small chord-pitch ratio diffuser blade 16 and the radial direction of the impeller 4 at a position of the leading edge 38) is uniform from a hub-side end 54 to a shroud-side end 56 of the leading edge 38 in the axial direction. In addition, in the embodiments shown in FIGS. 2, 4, and the like, a radially inner end 46 of the flow passage dividing annulus 22 is positioned inside of the leading edges 38 of the small chord-pitch ratio diffuser blades 16 in the radial direction, and a radially outer end 48 of the flow passage dividing annulus 22 is positioned inside of the trailing edges 39 of the small chord-pitch ratio diffuser blades 16 in the radial direction.

Figure 4:
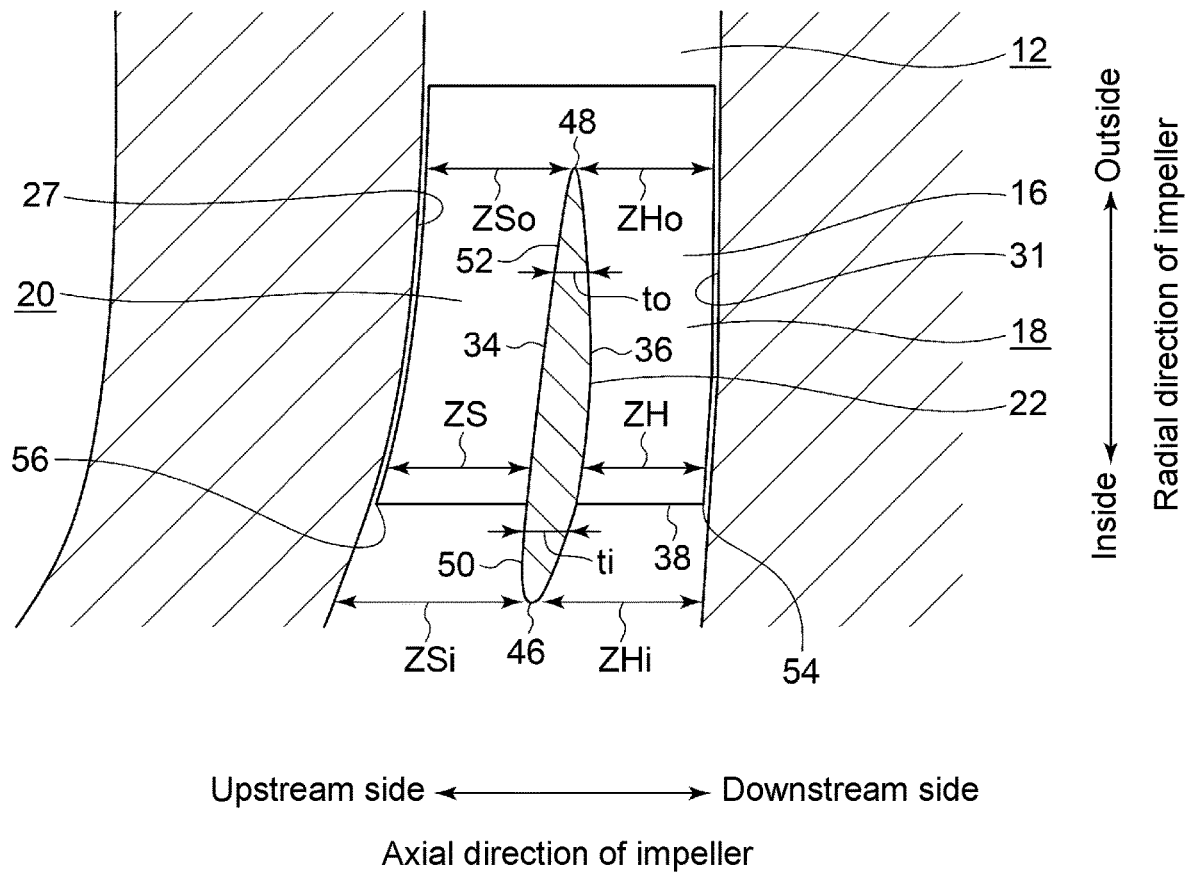
FIG. 4 is an enlarged view of the vicinity of a flow passage dividing annulus 22 in the centrifugal compressor 2 (2A).

In some embodiments, as shown in FIG. 4, for example, a radially-inner-side end portion 50 including the radially inner end 46 of the flow passage dividing annulus 22 is formed such that a thickness ti in the axial direction of the impeller 4 increases outward in the radial direction. In addition, a radially-outer-side end portion 52 including the radially outer end 48 of the flow passage dividing annulus 22 is formed such that a thickness to in the axial direction of the impeller increases inward in the radial direction. In the depicted illustrative embodiment, the flow passage dividing annulus 22 has a blade cross-sectional shape thinly formed in the vicinity of the radially inner end 46 and the vicinity of the radially outer end 48, and thickly formed in a center portion. The flow passage dividing annulus 22 may have a lenticular cross-sectional shape thinly formed in the vicinity of the radially inner end 46 and the vicinity of the radially outer end 48, and thickly formed in a center portion, or may be formed with a substantially constant thickness such that the vicinity of the radially inner end 46 and the vicinity of the radially outer end 48 are each formed into an arc shape.

With the above configuration, it is possible to suppress an increase in loss caused by a collision of the flow of the diffuser flow passage 12 with the radially-inner-side end portion 50 of the flow passage dividing annulus 22. It is also possible to suppress an increase in loss in the vicinity of the radially outer end 48 of the flow passage dividing annulus 22 by smoothly merging a flow of the hub-side flow passage 18 and a flow of the shroud-side flow passage 20 with each other.

In some embodiments, as shown in FIG. 4, for example, a flow-passage width ZH of the hub-side flow passage 18 in at least a partial section including the position of the radially inner end 46 in the axial direction of the impeller 4 decreases toward a downstream side. Thus, in the section, it is possible to reduce a thickness of a boundary layer along the above-described wall surfaces 31 and 36 facing the hub-side flow passage 18 toward the downstream side. In addition, the flow-passage width ZS of the shroud-side flow passage 20 in at least a partial section including the position of the radially inner end 46 in the axial direction of the impeller 4 decreases toward the downstream side. Thus, in the section, it is possible to reduce a thickness of a boundary layer along the above-described wall surfaces 27 and 34 facing the shroud-side flow passage 20 toward the downstream side. As a result, by the position of the radially outer end 48 of the flow passage dividing annulus 22, the flows on a hub side and shroud side have substantially the same boundary layer thickness, and a flow-velocity distribution of the hub-side flow passage 18 and a flow-velocity distribution of the shroud-side flow passage 20 become substantially equal to each other.

Moreover, as general characteristics of boundary layers, a downstream boundary layer tends to have a lower enlargement ratio in a case in which deacceleration is performed when an upstream boundary layer is thin than in a case in which the same deacceleration is performed when the upstream boundary layer is thick. In the depicted embodiment, in the hub-side flow passage 18 and the shroud-side flow passage 20, the flow-passage widths ZH and ZS in the axial direction of the impeller respectively increase toward an outer peripheral side in a partial section including the position of the radially outer end 48 of the flow passage dividing annulus 22. Therefore, the boundary layers along the wall surfaces 27, 31, 34, and 36 tend to be enlarged in the section. However, enlargement of each of the boundary layers in the section is suppressed by reducing the thickness of each boundary layer on an upstream side.

Furthermore, as shown in FIG. 3 and the like, the number of wall surfaces having the above-described sucking-out effect on the boundary layers BL formed along the suction surface 32 increases from two to four (wall surfaces 27, 31, 34, and 36) as compared with a case without the flow passage dividing annulus 22 (see FIG. 27), enhancing an effect of an increase in pressure recovery ratio of the small chord-pitch ratio diffuser 10. Therefore, the pressure recovery ratio effectively increases by canceling out an action of an increase in total boundary layer thickness caused by an increase itself in number of wall surfaces brought about by disposing the flow passage dividing annulus 22.

In some embodiments, as shown in FIG. 4, for example, the flow passage dividing annulus 22 is formed so as to satisfy $ZSi/ZHi > ZSo/ZHo$, where $ZSi$ is a flow-passage width of the shroud-side flow passage 20 in the axial direction of the impeller 4 at the position of the radially inner end 46 of the flow passage dividing annulus 22, $ZHi$ is a flow-passage width of the hub-side flow passage 18 in the axial direction at the position of the radially inner end 46 of the flow passage dividing annulus, $ZSo$ is a flow-passage width of the shroud-side flow passage 20 in the axial direction at the position of the radially outer end 48 of the flow passage dividing annulus, and $ZHo$ is a flow-passage width of the hub-side flow passage 18 in the axial direction at the position of the radially outer end 48 of the flow passage dividing annulus. That is, the flow passage dividing annulus 22 is configured such that a value $ZSi/ZHi$ obtained by dividing the flow-passage width $ZSi$ by the flow-passage width $ZHi$ is larger than a value $ZSo/ZHo$ obtained by dividing the flow-passage width $ZSo$ by the flow-passage width $ZHo$. A reason for such configuration will be described below.

Figure 5:
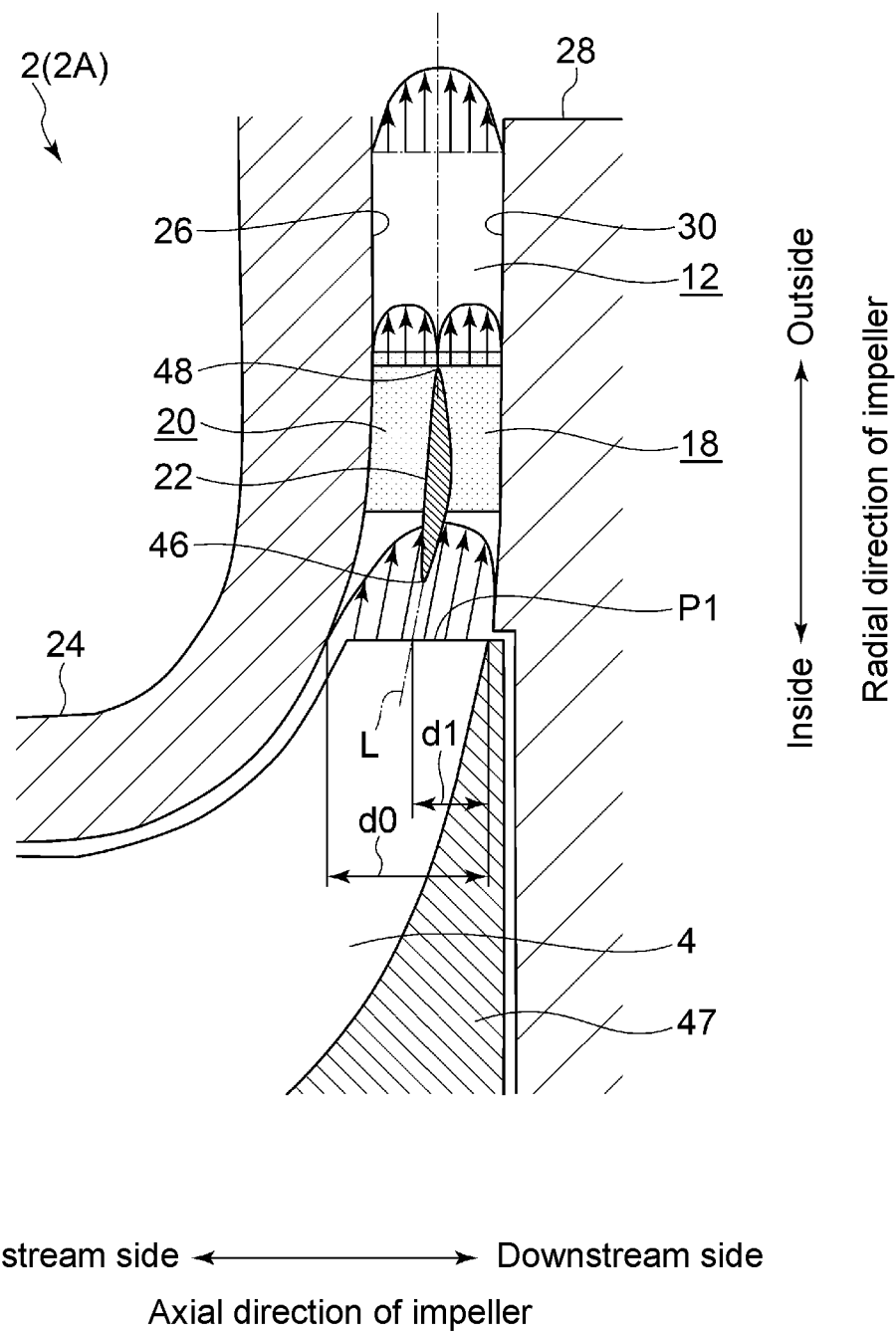
FIG. 5 is a view for describing deflections of flow-velocity distribution and flow rate in the diffuser flow passage 12.

As shown in FIG. 5, in the vicinity of an inlet position of the diffuser flow passage 12 (that is, the outlet position P1 of the impeller 4), a flow velocity and a flow rate are higher on the hub side than on the shroud side of the impeller 4. That is, if a virtual center line L which divides a flow rate into halves is drawn at the outlet position P1 of the impeller 4, a distance dl from a hub 47 of the impeller 4 to the center line L at the outlet position P1 of the impeller 4 is smaller than half an inlet width d0 of the diffuser flow passage 12.

Therefore, the flow passage dividing annulus 22 is configured so as to satisfy $ZSi/ZHi > ZSo/ZHo$ as described above, thereby decreasing the ratio of the flow-passage width ZS of the shroud-side flow passage 20 to the flow-passage width ZH of the hub-side flow passage 18 while passing through the flow passage dividing annulus 22. It is thus possible to uniform a flow-velocity distribution at the position of the radially outer end 48 of the flow passage dividing annulus 22 by reducing a difference in flow velocity between the hub-side flow passage 18 and the shroud-side flow passage 20. Therefore, it is possible to uniform a flow velocity distribution in the vicinity of the outlet position of the diffuser flow passage 12.

Thus, it is possible to implement the highly efficient centrifugal compressor 2 (2A) by effectively suppressing an increase in loss in the diffuser flow passage 12 and increasing the pressure recovery ratio in the diffuser flow passage 12. The above-described value $ZSo/ZHo$ may preferably be about the same as a value $QSi/QHi$ (for example, within a range of 90% to 110% with respect to the value $QSi/QHi$). The value $QSi/QHi$ is obtained by dividing a flow rate $QSi$ of the shroud-side flow passage 20 at the position of the radially inner end 46 of the flow passage dividing annulus 22 by a flow rate $QHi$ of the hub-side flow passage 18 at the position of the radially inner end 46 of the flow passage dividing annulus 22.

Figure 6:
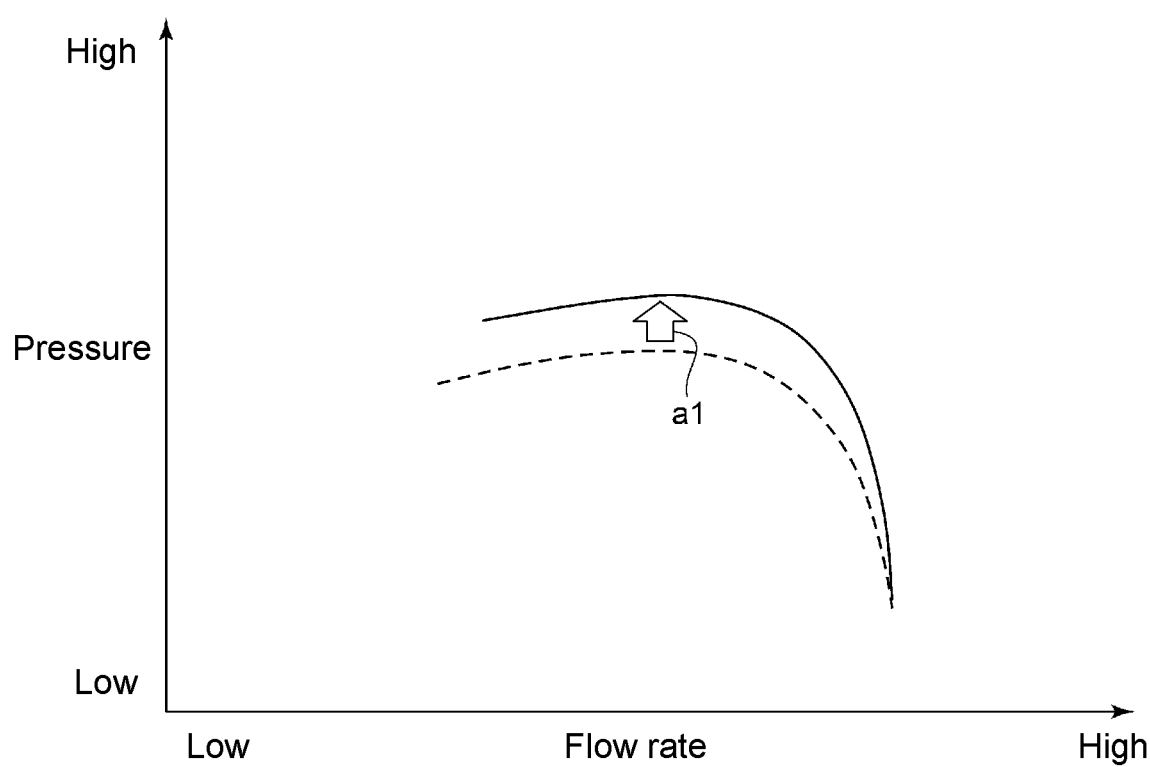
FIG. 6 is a graph showing a comparison between a flow-rate pressure characteristic of the centrifugal compressor 2 (2A) and a flow-rate pressure characteristic of a typical centrifugal compressor with a vaneless diffuser.
Figure 7:
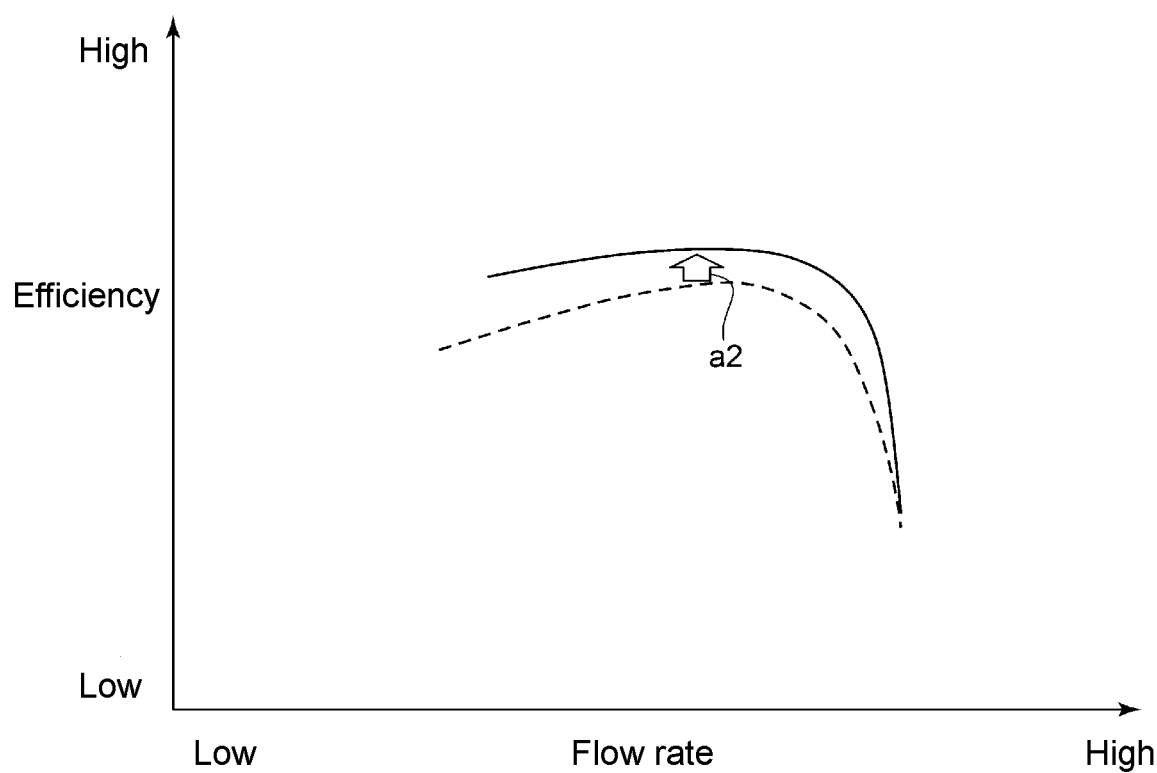
FIG. 7 is a graph showing a comparison between a flow-rate efficiency characteristic of the centrifugal compressor 2 (2A) and a flow-rate efficiency characteristic of the typical centrifugal compressor with the vaneless diffuser.

FIG. 6 is a graph showing a comparison between a flow-rate pressure characteristic of the above-described centrifugal compressor 2 (2A) and a flow-rate pressure characteristic of a typical centrifugal compressor with a vaneless diffuser. FIG. 7 is a graph showing a comparison between a flow-rate efficiency characteristic of the above-described centrifugal compressor 2 (2A) and a flow-rate efficiency characteristic of the typical centrifugal compressor with the vaneless diffuser. In FIG. 6, a solid line indicates the flow-rate pressure characteristic of the centrifugal compressor 2 (2A), and a dashed line indicates the flow-rate pressure characteristic of the typical centrifugal compressor with a vaneless diffuser. Moreover, in FIG. 7, a solid line indicates the flow-rate efficiency characteristic of the centrifugal compressor 2 (2A), and a dashed line indicates the flow-rate efficiency characteristic of the typical centrifugal compressor with the vaneless diffuser. As indicated by an arrow a1 of FIG. 6 and an arrow a2 of FIG. 7, according to the centrifugal compressor 2 (2A), it is possible to implement a higher pressure and higher efficiency than those of the typical centrifugal compressor with the vaneless diffuser.

Figure 8:
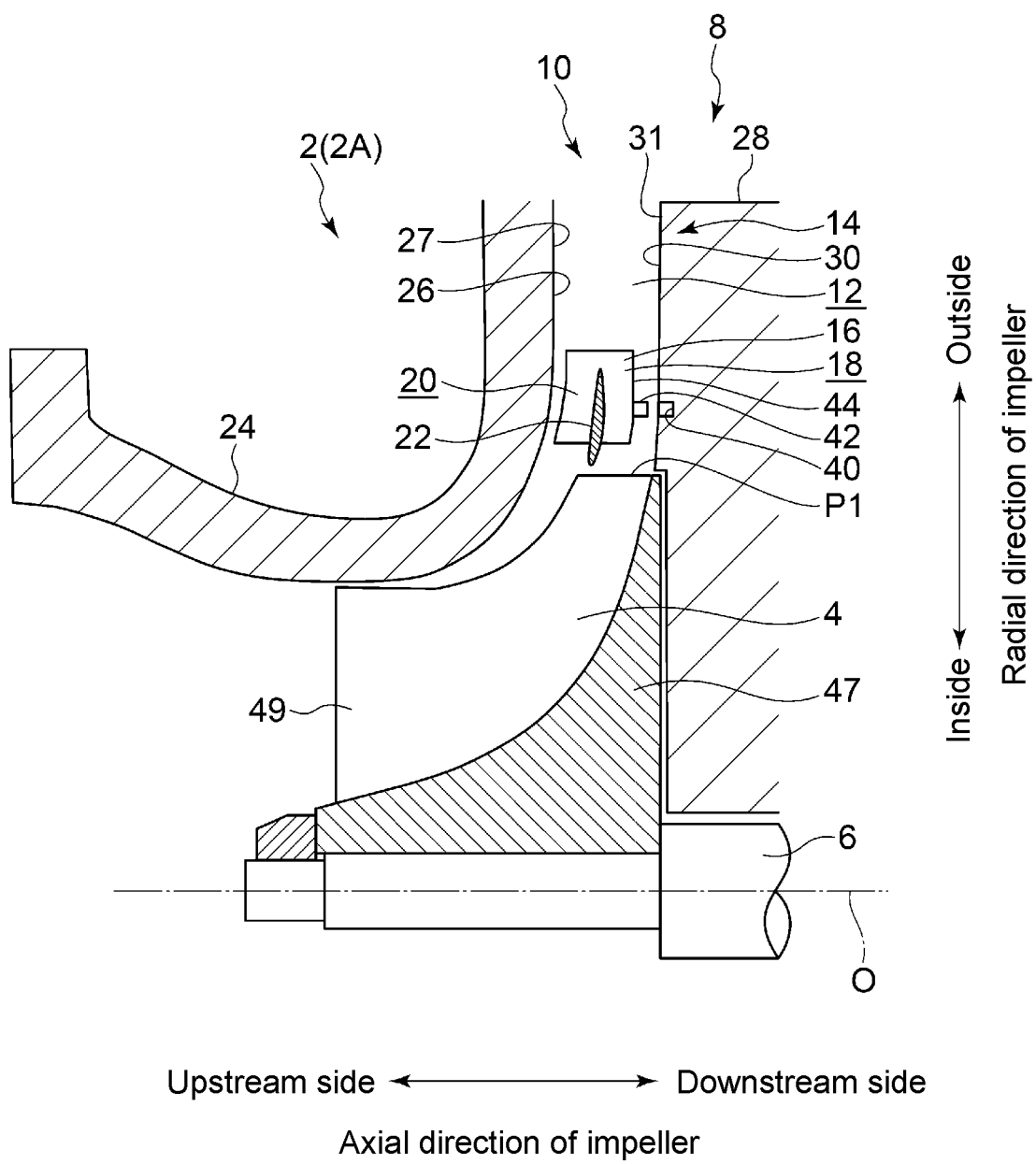
FIG. 8 is a view for describing an example of a method of fixing a small chord-pitch ratio diffuser blade 16 in a case in which the small chord-pitch ratio diffuser blade 16 and the flow passage dividing annulus 22 are formed integrally, showing a state in which the small chord-pitch ratio diffuser blade 16 and a shroud casing 24 are removed from predetermined positions.
Figure 9:
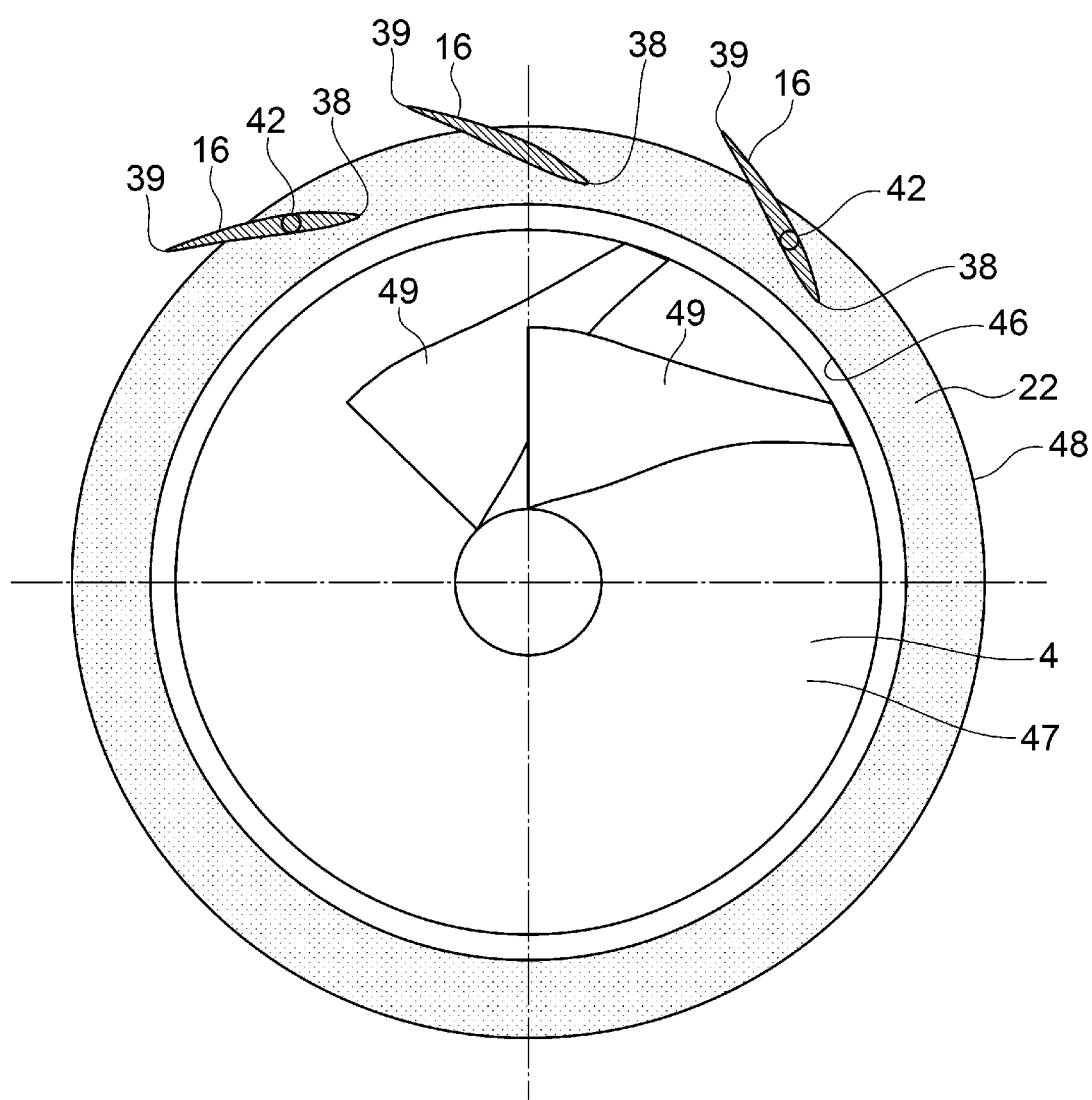
FIG. 9 is a schematic view partially showing an arrangement example of the internal configuration of the centrifugal compressor 2 (2A), as seen from the upstream side along the rotational axis O of the impeller 4.

In some embodiments, as shown in FIGS. 8 and 9, for example, the flow passage dividing annulus 22 is formed integrally with the plurality of small chord-pitch ratio diffuser blades 16. In addition, as shown in FIG. 8, the small chord-pitch ratio diffuser blade 16 includes a diffuser-vane-side engagement portion 42 which engages with a flow-passage-wall-side engagement portion 40 disposed on the diffuser flow passage forming portion 14. The diffuser-vaneside engagement portion 42 engages with the flow-passage-wall-side engagement portion 40 so that the flow passage dividing annulus 22 is held in the diffuser flow passage 12. In the depicted illustrative embodiment, the diffuser-vane-side engagement portion 42 is configured as a projection portion which protrudes from an end surface 44, which faces the hub-side flow passage wall portion 30, of the small chord-pitch ratio diffuser blade 16 toward the hub-side flow passage wall portion 30 in the axial direction, and the flow-passage-wall-side engagement portion 40 is configured as a fitting hole which is fitted to the projection portion. The diffuser-vane-side engagement portion 42 is provided as, for example, a column-shaped or cone-shaped projection portion at a position of the small chord-pitch ratio diffuser blade 16 corresponding to the thickest portion. The flow-passage-wall-side engagement portion 40 is configured as a circular hole fitted to this projection portion. The diffuser-vane-side engagement portions 42 may be disposed on all the small chord-pitch ratio diffuser blades 16 or may be disposed on some of the small chord-pitch ratio diffuser blades 16 as shown in FIG. 9.

With the above configuration, it is possible to configure the flow passage dividing annulus 22 and the plurality of small chord-pitch ratio diffuser blades 16 as one annular component. Moreover, engaging the diffuser-vane-side engagement portion 42 with the flow-passage-wall-side engagement portion 40, it is possible to fix the one annular component coaxially with the rotational shaft 6 of the impeller 4. The one annular component includes the flow passage dividing annulus 22 and the plurality of small chord-pitch ratio diffuser blades 16.

Figure 10:
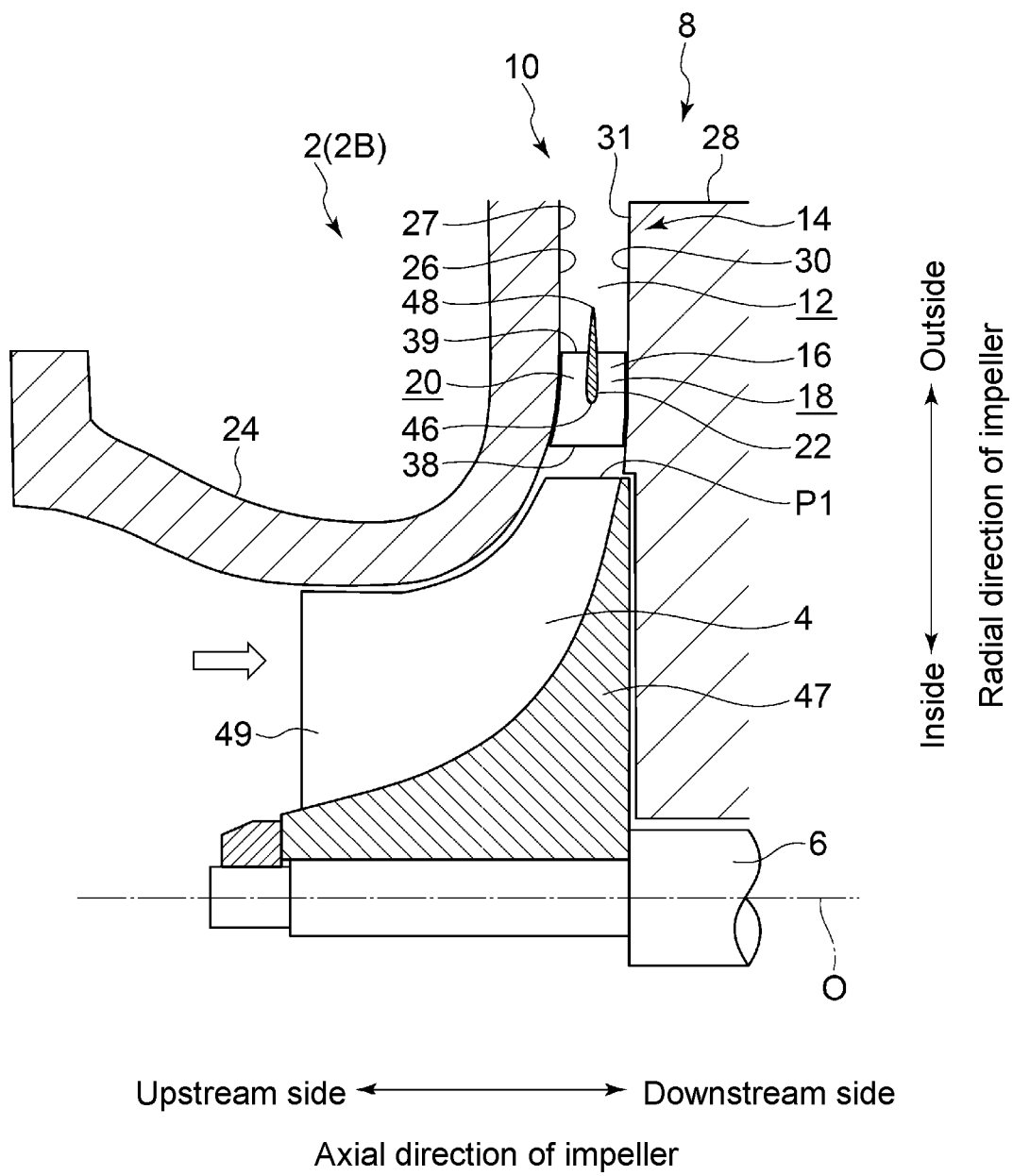
FIG. 10 is a meridional view of a part of a centrifugal compressor 2 (2B) according to an embodiment.
Figure 11:
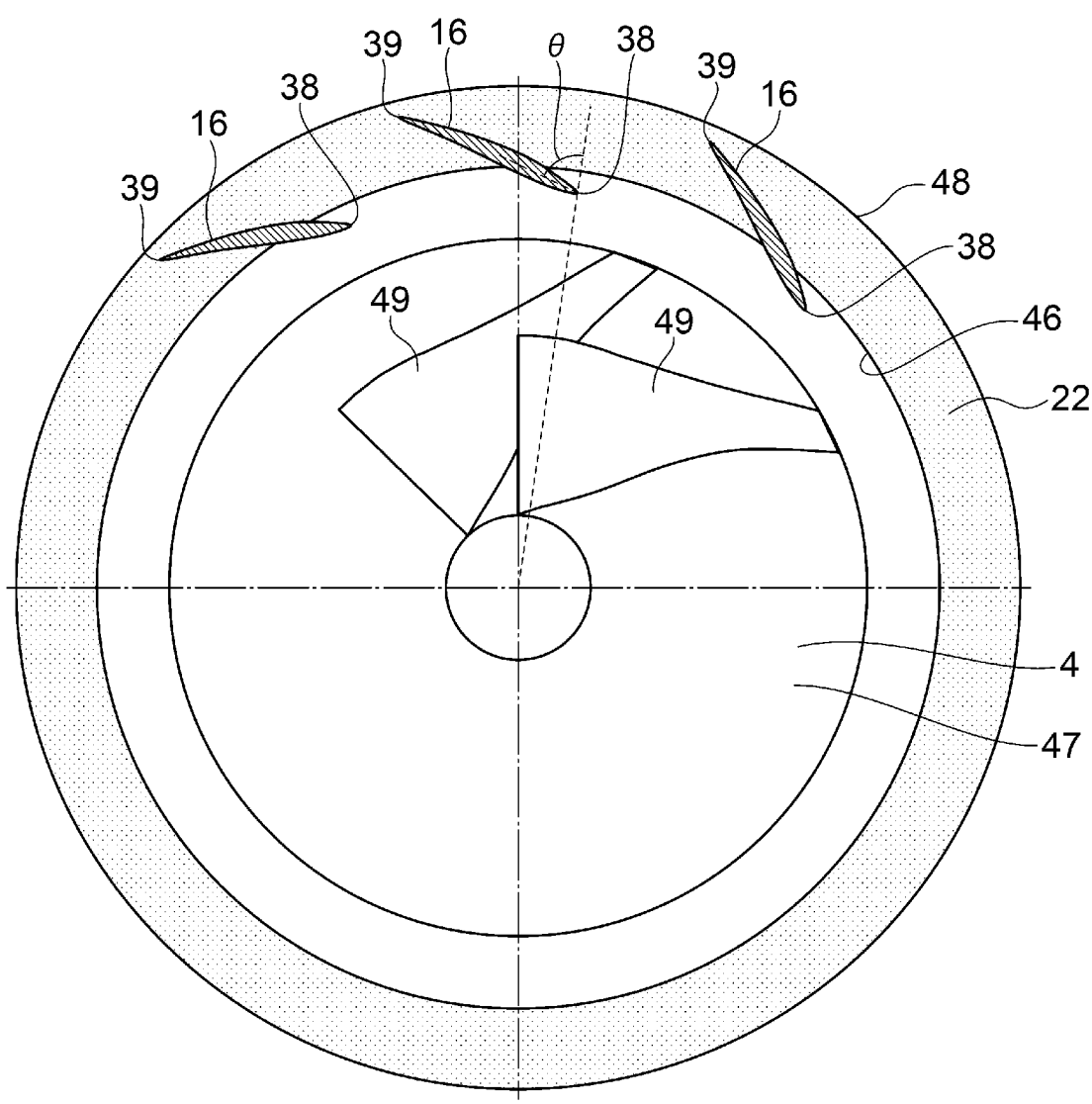
FIG. 11 is a schematic view partially showing an arrangement of the internal configuration of the centrifugal compressor 2 (2B), as seen from the upstream side along the rotational axis O of the impeller 4.

FIG. 10 is a meridional view of a part of a centrifugal compressor 2 (2B) according to an embodiment. FIG. 11 is a schematic view partially showing an arrangement of an internal configuration of the centrifugal compressor 2 (2B), as seen from the upstream side along the rotational axis O of the impeller 4. In the following description, members having functions similar to the respective configurations of the centrifugal compressor 2 (2A) are indicated by the same reference numerals and are not described in detail, and a different configuration from the centrifugal compressor 2 (2A) will mainly be described.

In some embodiments, as shown in FIGS. 10 and 11, for example, the radially inner end 46 of the flow passage dividing annulus 22 is positioned outside of the leading edges 38 of the small chord-pitch ratio diffuser blades 16 in the radial direction. In addition, in the depicted embodiments, the radially outer end 48 of the flow passage dividing annulus 22 is positioned outside of the trailing edges 39 of the small chord-pitch ratio diffuser blades 16 in the radial direction.

Figure 12:
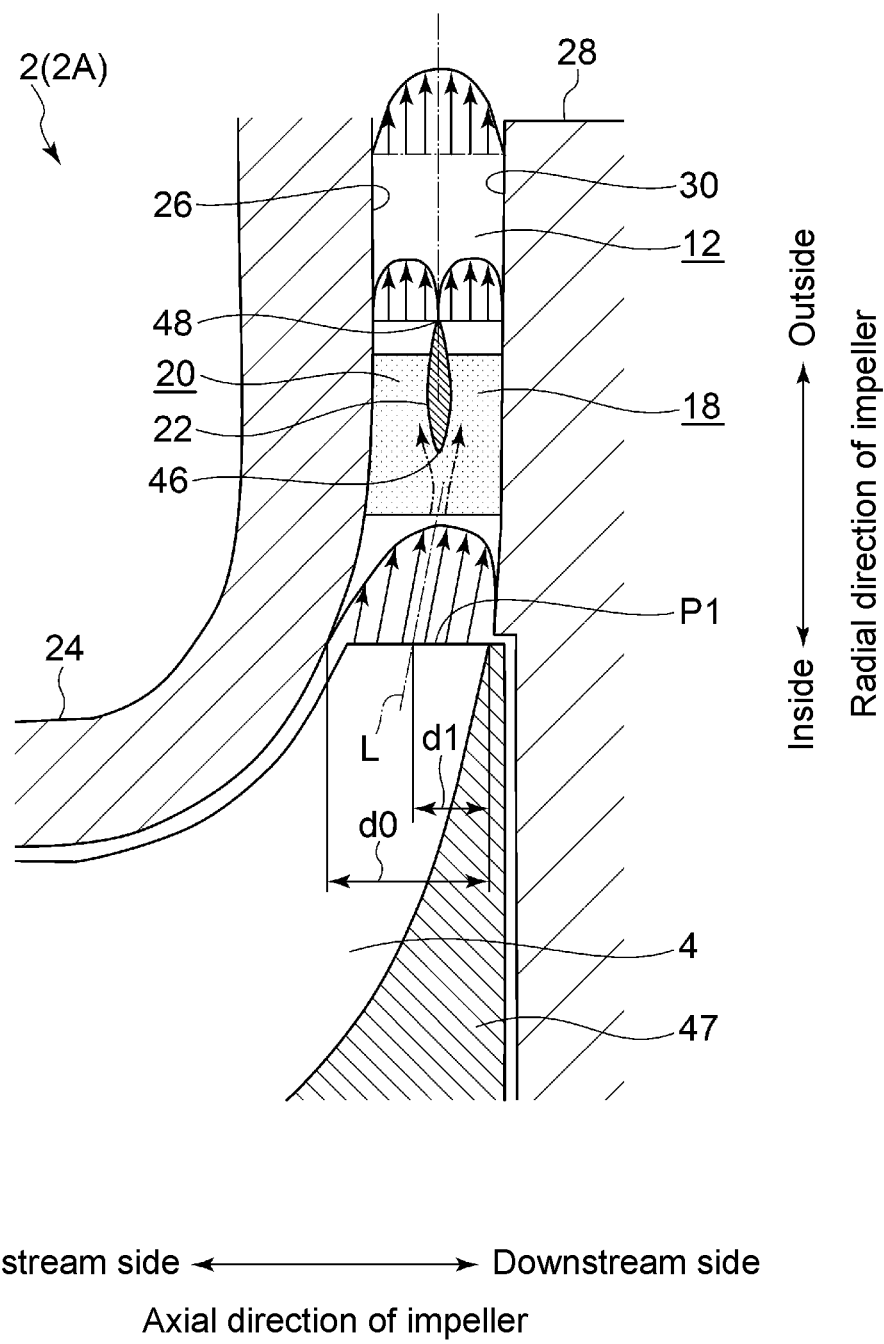
FIG. 12 is a view for describing an action exhibited by the centrifugal compressor 2 (2B).

In the above configuration, when the hub side has more flow with respect to the flow passage dividing annulus 22, an amount of increase in static pressure of a flow passage having a high flow rate is smaller than that of a flow passage having a low flow rate. Therefore, in order to balance a pressure, an increase in flow rate of the flow passage having the high flow rate is suppressed, facilitating an increase in flow rate of the flow passage having the low flow rate. As a result, the flow-velocity distribution of the hub-side flow passage 18 and the flow-velocity distribution of the shroud-side flow passage 20 become substantially equal to each other. At this time, a flow line moves in the axial direction in the vicinity of the radially inner end 46 of the flow passage dividing annulus 22, and thus the flow line smoothly moves because of the blade cross-sectional shape of the flow passage dividing annulus 22 (see FIG. 12).

At this time, the boundary layers start to develop on the wall surfaces 34 and 36 of the flow passage dividing annulus 22 as well from the position of the radially inner end 46. However, since the flow-passage width in the axial direction of the impeller 4 in the shroud-side flow passage 20 narrows toward the downstream side in the vicinity of the radially inner end 46, a flow on the shroud side of the flow passage dividing annulus 22 is accelerated, a development in boundary layer along the wall surface 27 of the shroud-side flow passage wall portion 26 is suppressed, and the flow-velocity distribution is uniformed.

Also for a flow on the hub side of the flow passage dividing annulus 22, since the flow-passage width in the axial direction of the impeller 4 in the hub-side flow passage 18 narrows toward the downstream side in the vicinity of the radially inner end 46, the flow on the hub side of the flow passage dividing annulus 22 is accelerated, a development in boundary layer along the wall surface 31 of the hub-side flow passage wall portion 30 is suppressed, and the flow-velocity distribution is uniformed. The flow-passage width of the hub-side flow passage 18 and the flow-passage width of the shroud-side flow passage widen in the middle of the respective flow passages. Therefore, a flow velocity in the radial direction of the impeller 4 decreases, increasing the static pressure, and the pressure of the hub-side flow passage 18 and the pressure of the shroud-side flow passage 20 become substantially equal to each other at the position of the radially outer end 48 of the flow passage dividing annulus 22.

From uniformalization of the flow-velocity distributions caused by the increase in radial velocity, the deacceleration on its downstream side, and a characteristic that a static pressure distribution becomes uniform in the direction perpendicular to the wall surface 27 of the shroud-side flow passage wall portion 26 and the wall surface 31 of the hub-side flow passage wall portion 30 so as to have the shortest distance therebetween, the following action is produced; a flow rate is divided into the respective flow passages 18 and 20 at the position of the radially inner end 46 of the flow passage dividing annulus 22 approximately in proportion to the flow-passage widths of the respective flow passages 18 and 20 at the position of the radially outer end 48 of the flow passage dividing annulus 22 so that each of the flow passages 18 and 20 has static pressure at the position of the radially outer end 48. In addition, the flow passage dividing annulus 22 of the centrifugal compressor 2 (2B) has a larger inner diameter than the flow passage dividing annulus 22 of the centrifugal compressor 2 (2A), producing an effect of advancing uniformalization of drifts during a distance to the radially outer end 48 of the flow passage dividing annulus 22. Thus, also in the centrifugal compressor 2 (2B), it is possible to implement the highly efficient centrifugal compressor by increasing the pressure recovery ratio in the diffuser flow passage.

Figure 13:
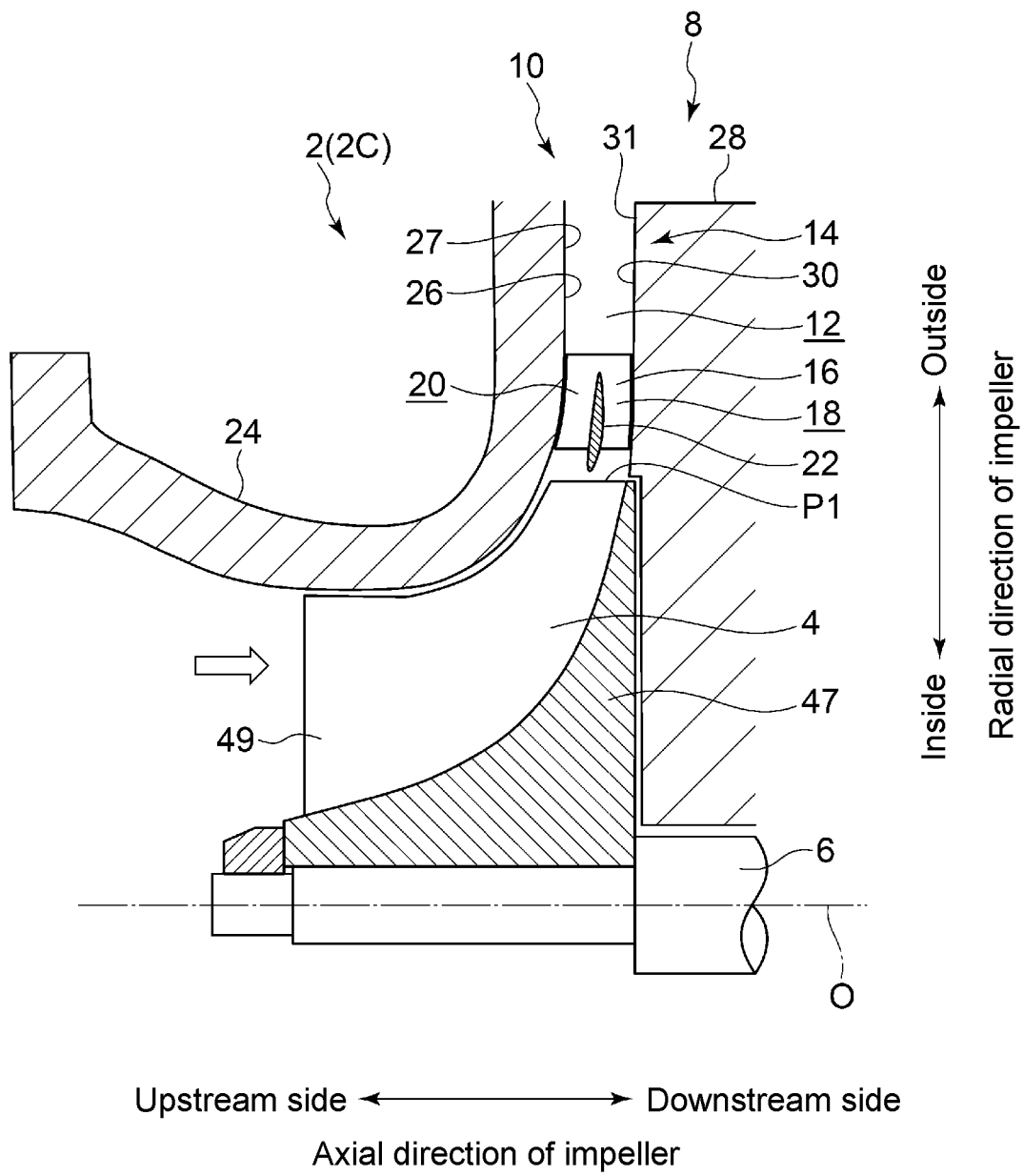
FIG. 13 is a meridional view of a part of a centrifugal compressor 2 (2C) according to an embodiment.
Figure 14:
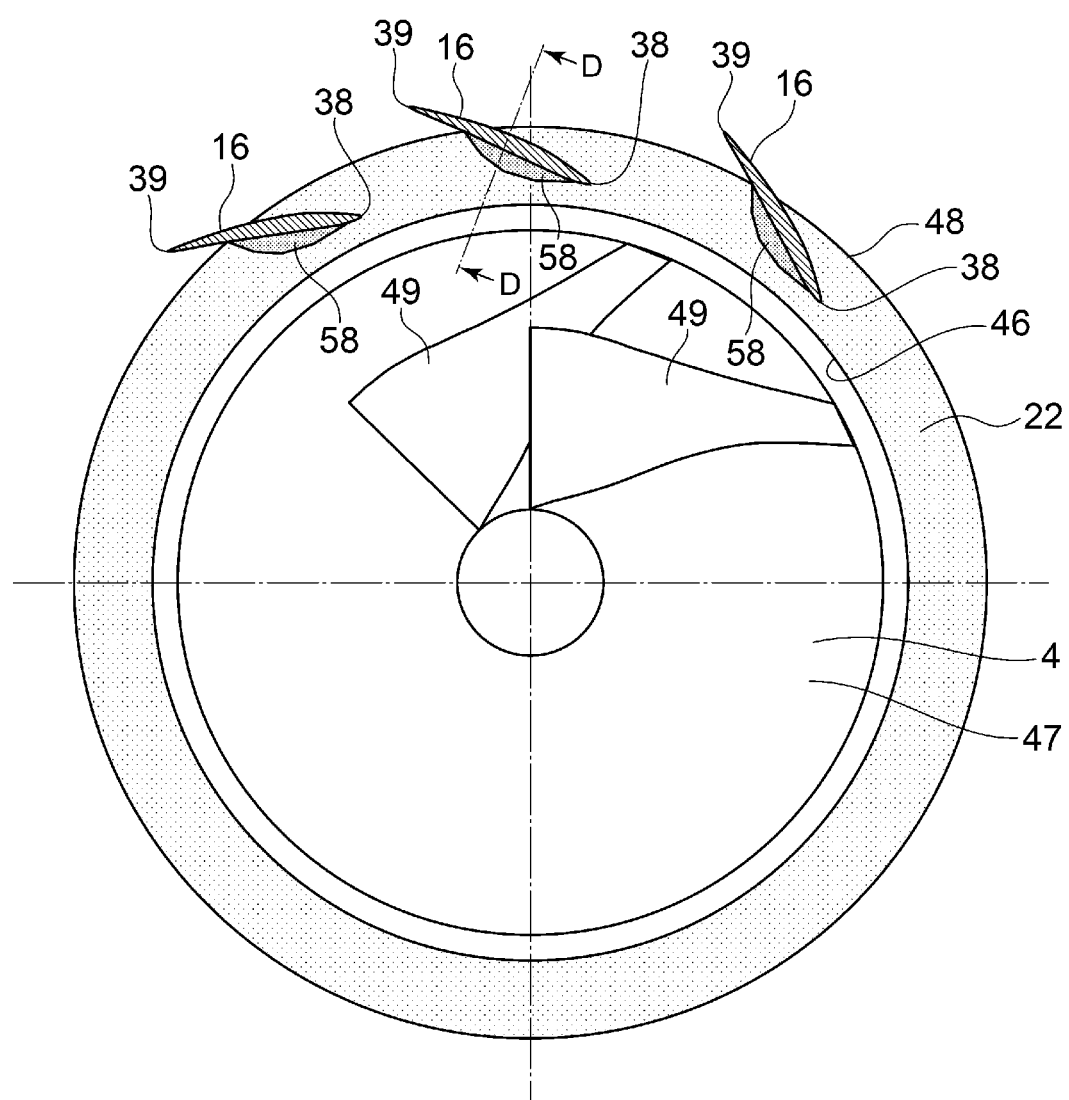
FIG. 14 is a schematic view partially showing an arrangement of an internal configuration of the centrifugal compressor 2 (2C), as seen from the upstream side along the rotational axis O.
Figure 15:
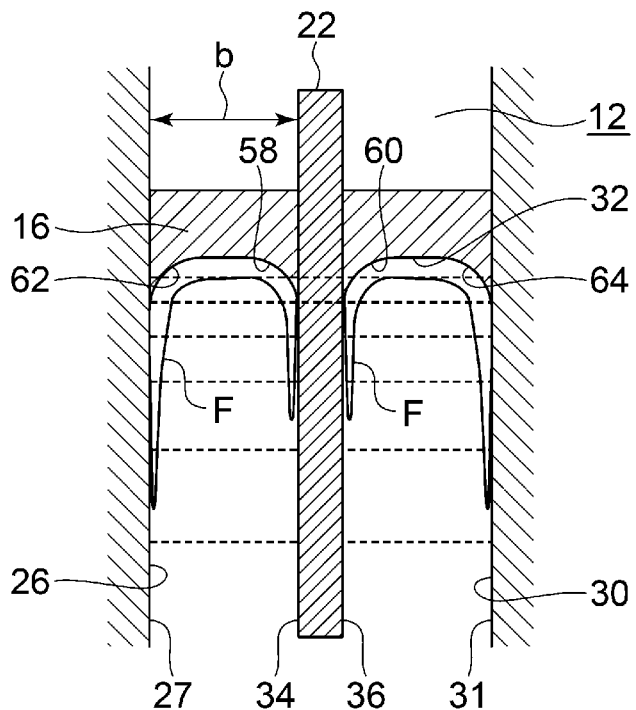
FIG. 15 is a schematic view showing an example taken along line D-D in FIG. 14.
Figure 16:
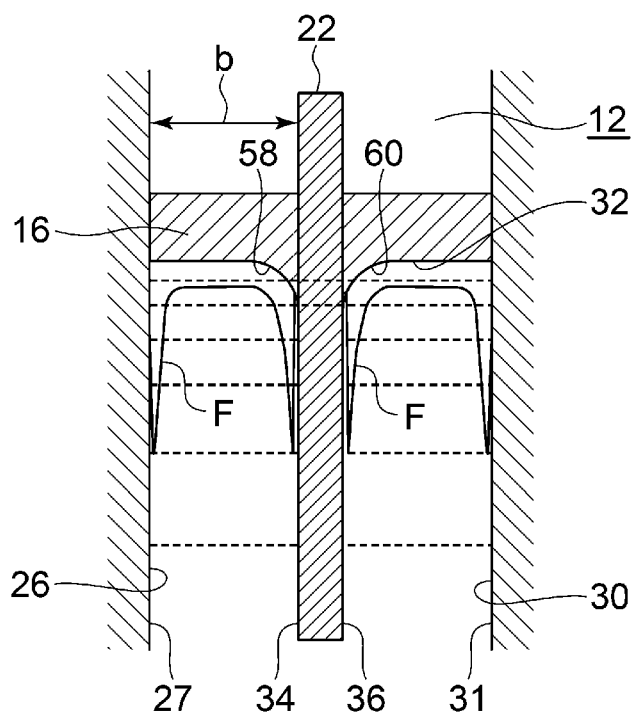
FIG. 16 is a schematic view showing another example taken along line D-D in FIG. 14.

FIG. 13 is a meridional view of a part of a centrifugal compressor 2 (2C) according to an embodiment. FIG. 14 is a schematic view partially showing an arrangement of an internal configuration of the centrifugal compressor 2 (2C), as seen from the upstream side along the rotational axis O. FIG. 15 is a schematic view showing an example taken along line D-D in FIG. 14. FIG. 16 is a schematic view showing another example taken along line D-D in FIG. 14. In the following description, members having functions similar to the respective configurations of the centrifugal compressor 2 (2A) are indicated by the same reference numerals and are not described in detail, and a different configuration from the centrifugal compressor 2 (2A) will mainly be described.

In some embodiments, as shown in FIGS. 15 and 16, a corner R portion 58 is formed in a corner portion between the suction surface 32 of the small chord-pitch ratio diffuser blade 16 and the wall surface 34 of the flow passage dividing annulus 22, and a corner R portion 60 is formed in a corner portion between the suction surface 32 of the small chord-pitch ratio diffuser blade 16 and the wall surface 36 of the flow passage dividing annulus 22.

In the embodiment shown in FIG. 15, a corner R portion 62 is formed in a corner portion between the suction surface 32 of the small chord-pitch ratio diffuser blade 16 and the wall surface 27 of the shroud-side flow passage wall portion 26, and a corner R portion 64 is formed in a corner portion between the suction surface 32 of the small chord-pitch ratio diffuser blade 16 and the wall surface 31 of the hub-side flow passage wall portion 30.

In the embodiment shown in FIG. 16, any corner R portion is not formed in the corner portion between the suction surface 32 of the small chord-pitch ratio diffuser blade 16 and the wall surface 27 of the shroud-side flow passage wall portion 26, and any corner R portion is not formed in the corner portion between the suction surface 32 of the small chord-pitch ratio diffuser blade 16 and the wall surface 31 of the hub-side flow passage wall portion 30.

In the embodiment of FIG. 16, the flow passage dividing annulus 22 shown in FIGS. 8 and 9 can easily be processed by casting using a mold which holds a member in the axial direction, the member being formed integrally with the plurality of small chord-pitch ratio diffuser blades 16. It is therefore possible to increase surface accuracy and reduce surface roughness.

Respective R dimensions of the above corner R portions 58, 60, 62, and 64 preferably fall within a range of 20% to 50% of a blade height b of a blade height, which is divided by the flow passage dividing annulus 22, of the small chord-pitch ratio diffuser blade 16.

As described above, by disposing the corner R portions each having an R dimension on the order of the thickness of the boundary layer on the suction surface 32 of the small chord-pitch ratio diffuser blade 16, sucking-out effects of the boundary layers on the suction surface 32 (curves F in FIGS. 15 and 16) are further exerted, and an outward pressure increase effect in the radial direction of the impeller 4 by the counteraction of the lift of the small chord-pitch ratio diffuser blade 16 is enhanced. Consequently, the pressure recovery ratio is further increased, making it possible to implement the centrifugal compressor with a high pressure and high efficiency.

Figure 17:
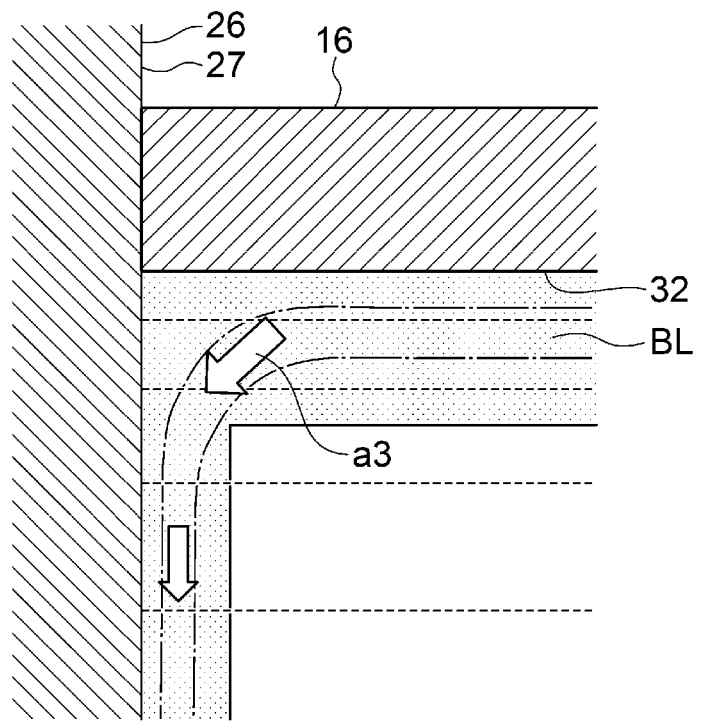
FIG. 17 is a view for describing a sucking-out effect of the boundary layer on a suction surface 32 of the small chord-pitch ratio diffuser blade 16.
Figure 18:
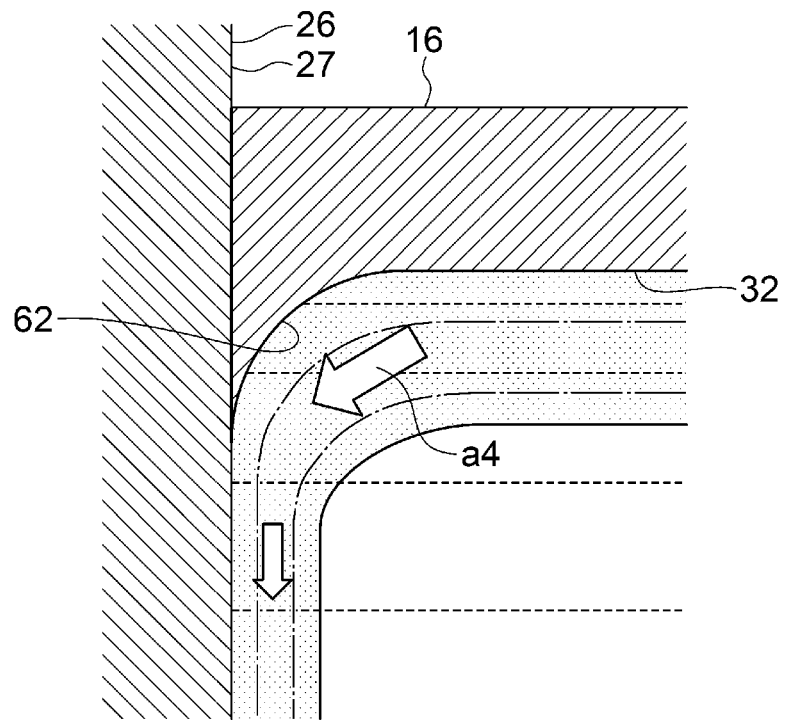
FIG. 18 is a view for describing the sucking-out effect of the boundary layer on the suction surface 32 of the small chord-pitch ratio diffuser blade 16 in a case in which a corner R portion is disposed.

As an example for describing effects of the corner R portions 58, 60, 62, and 64, FIG. 17 shows a state of the boundary layer without the corner R portion 62 being disposed, and FIG. 18 shows a state of the boundary layer with the corner R portion 62 being disposed. In FIGS. 17 and 18, dashed lines indicate constant pressure lines, and single-dotted chain lines indicate constant velocity lines.

If the small chord-pitch ratio diffuser blade 16 is disposed, a force exerting the sucking-out effect of the boundary layer BL on the suction surface 32 is applied as indicated by an arrow a3 of FIG. 17, and the constant pressure lines and the constant velocity lines of the boundary layer intersect with each other, and the boundary layer moves from a location with a high pressure to a location with a low pressure.

Furthermore, if the corner R portions (the corner R portion 62 in the depicted example) are disposed, an area widens in which the force exerting the sucking-out effect of the boundary layer BL on the suction surface 32 is applied. Thus, as indicated by an arrow a4 of FIG. 18, a total force moving the boundary layer BL increases. Thus, as described above, the pressure recovery ratio is further increased, making it possible to implement the centrifugal compressor with the high pressure and high efficiency.

Figure 19:
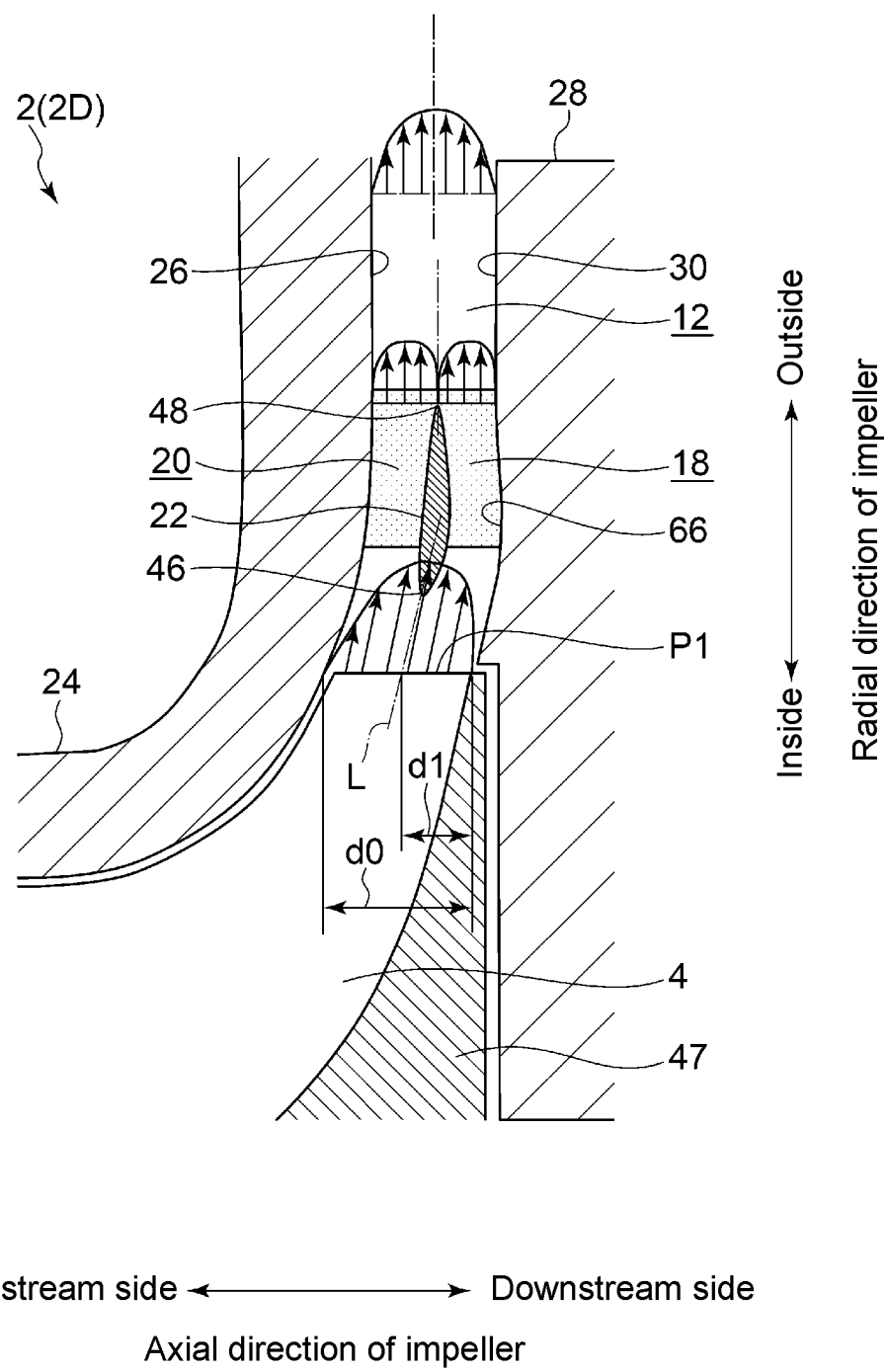
FIG. 19 is a view for describing the shape of a diffuser flow passage forming portion 14 of a centrifugal compressor 2 (2D) according to an embodiment.

FIG. 19 is a view for describing the shape of the diffuser flow passage forming portion 14 of a centrifugal compressor 2 (2D) according to an embodiment.

In some embodiments, as shown in FIG. 19, for example, the wall suction surface 31 of the hub-side flow passage wall portion 30 has a smooth curved surface shape 66 recessed in a backward direction (a direction away from the wall surface 27 of the shroud-side flow passage wall portion 26) in at least a part of the section of the diffuser flow passage 12 where the flow passage dividing annulus 22 exists. In the depicted embodiment, of the hub-side flow passage 18, the wall surface 31 of a partial section including a position where the thickness of the flow passage dividing annulus 22 in the axial direction of the impeller 4 is the largest is recessed in the backward direction with respect to the wall surface 31 in an outlet region of the diffuser flow passage 12.

With the above configuration, even if the thickness of the flow passage dividing annulus 22 in the axial direction of the impeller 4 increases to some extent due to limitations of a strength and manufacturing method of the flow passage dividing annulus 22, it is possible to form the diffuser flow passage 12 exerting a good function.

Embodiments of the present invention were described in detail above, but the present invention is not limited thereto, and various amendments and modifications may be implemented.

For example, FIG. 19 depicts an embodiment in which the wall surface 31 of the hub-side flow passage wall portion 30 has the smooth curved surface shape 66 recessed in the backward direction. However, the wall surface 27 of the shroud-side flow passage wall portion 26 may have a smooth curved surface shape recessed in a frontward direction (a direction away from the wall surface 31 of the hub-side flow passage wall portion 30) in at least the part of the section of the diffuser flow passage 12 where the flow passage dividing annulus 22 exists.

Further, in each embodiment described above, the hub-side flow passage 18 includes the section in which the flow-passage width ZH decreases from the position of the radially inner end 46 toward the downstream side, and the section which connects said section and the radially outer end 48 and in which the flow-passage width ZH increases toward the downstream side. However, the shape of the hub-side flow passage 18 is not limited to this. The hub-side flow passage 18 may include, for example, the section in which the flow-passage width ZH decreases from the position of the radially inner end 46 toward the downstream side, and a section which connects said section and the radially outer end 48 and in which the flow-passage width ZH is constant. Alternatively, the hub-side flow passage 18 may be configured such that, for example, the flow-passage width ZH decreases from the position of the radially inner end 46 to the position of the radially outer end 48.

Further, in each embodiment described above, the shroud-side flow passage 20 includes the section in which the flow-passage width ZS decreases from the position of the radially inner end 46 toward the downstream side, and the section which connects said section and the radially outer end 48 and in which the flow-passage width ZS increases toward the downstream side. However, the shape of the shroud-side flow passage 20 is not limited to this. The shroud-side flow passage 20 may include, for example, the section in which the flow-passage width ZS decreases from the position of the radially inner end 46 toward the downstream side, and a section which connects said section and the radially outer end 48 and in which the flow-passage width ZS is constant. Alternatively, the shroud-side flow passage 20 may be configured such that, for example, the flow-passage width ZS decreases from the position of the radially inner end 46 to the position of the radially outer end 48.

Figure 20:
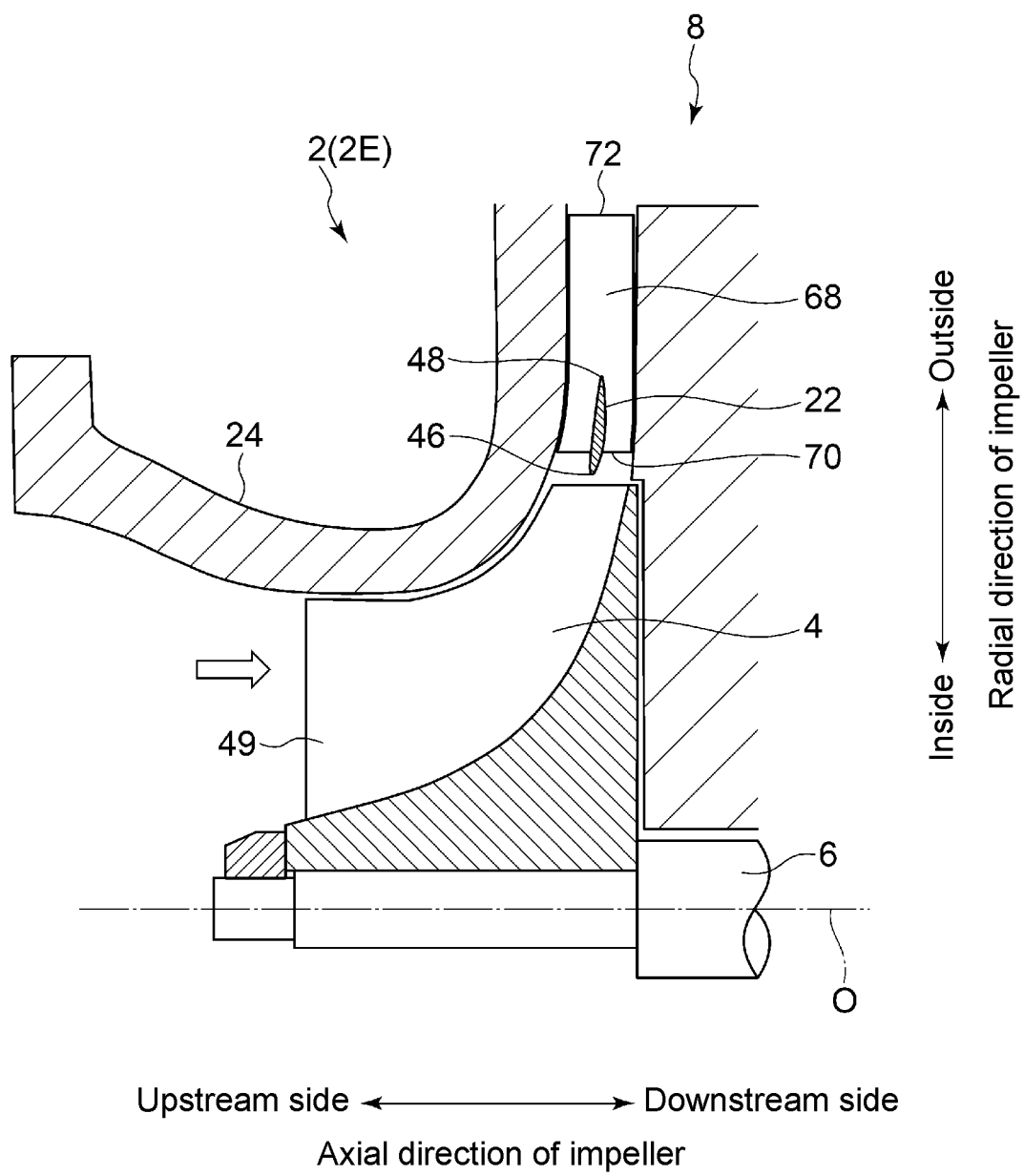
FIG. 20 is a meridional view of a part of a centrifugal compressor 2 (2E) according to a reference embodiment.
Figure 21:
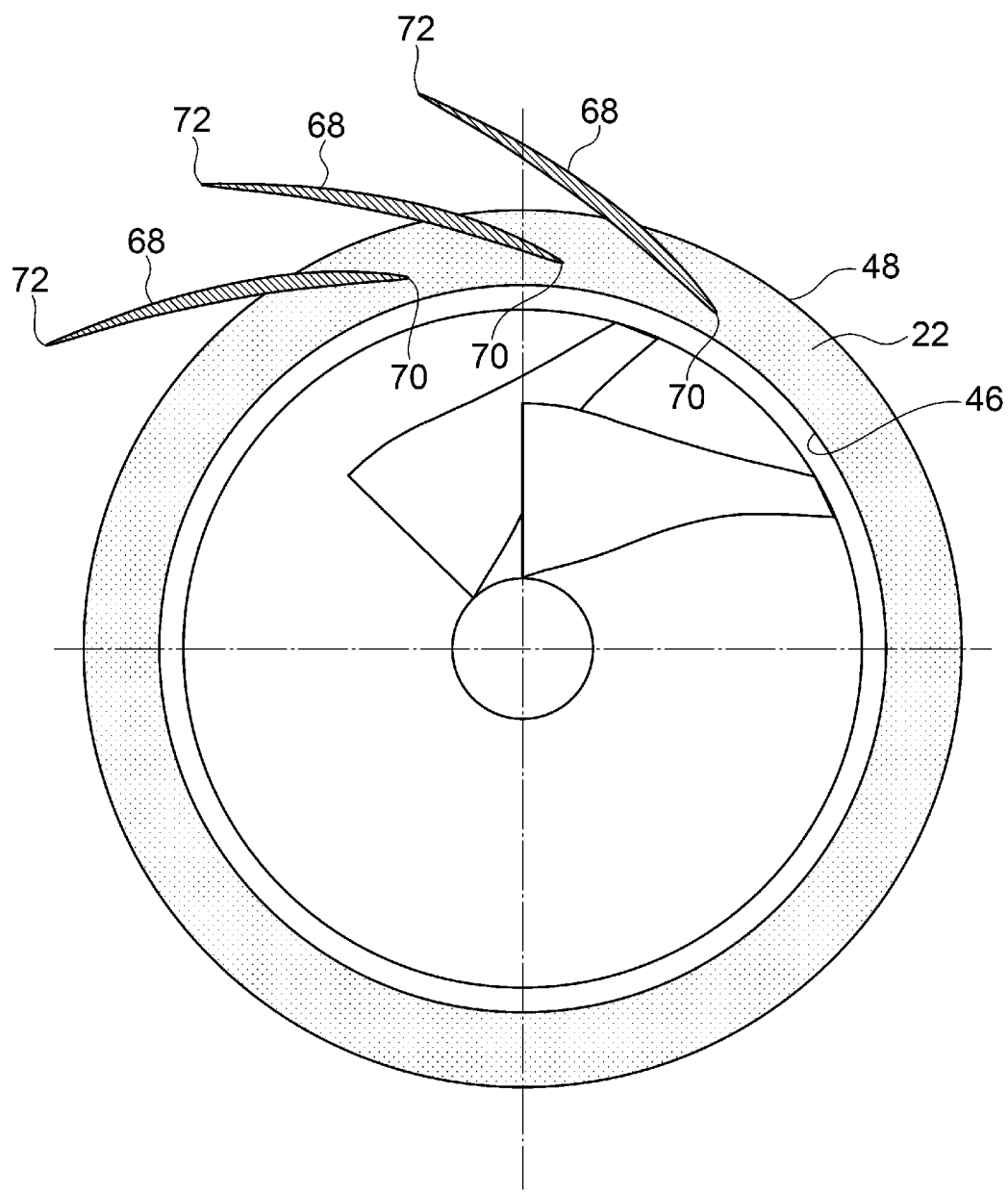
FIG. 21 is a schematic view partially showing an arrangement example of the internal configuration of the centrifugal compressor 2 (2E), as seen from the upstream side along the rotational axis O of the impeller 4.
Figure 22:
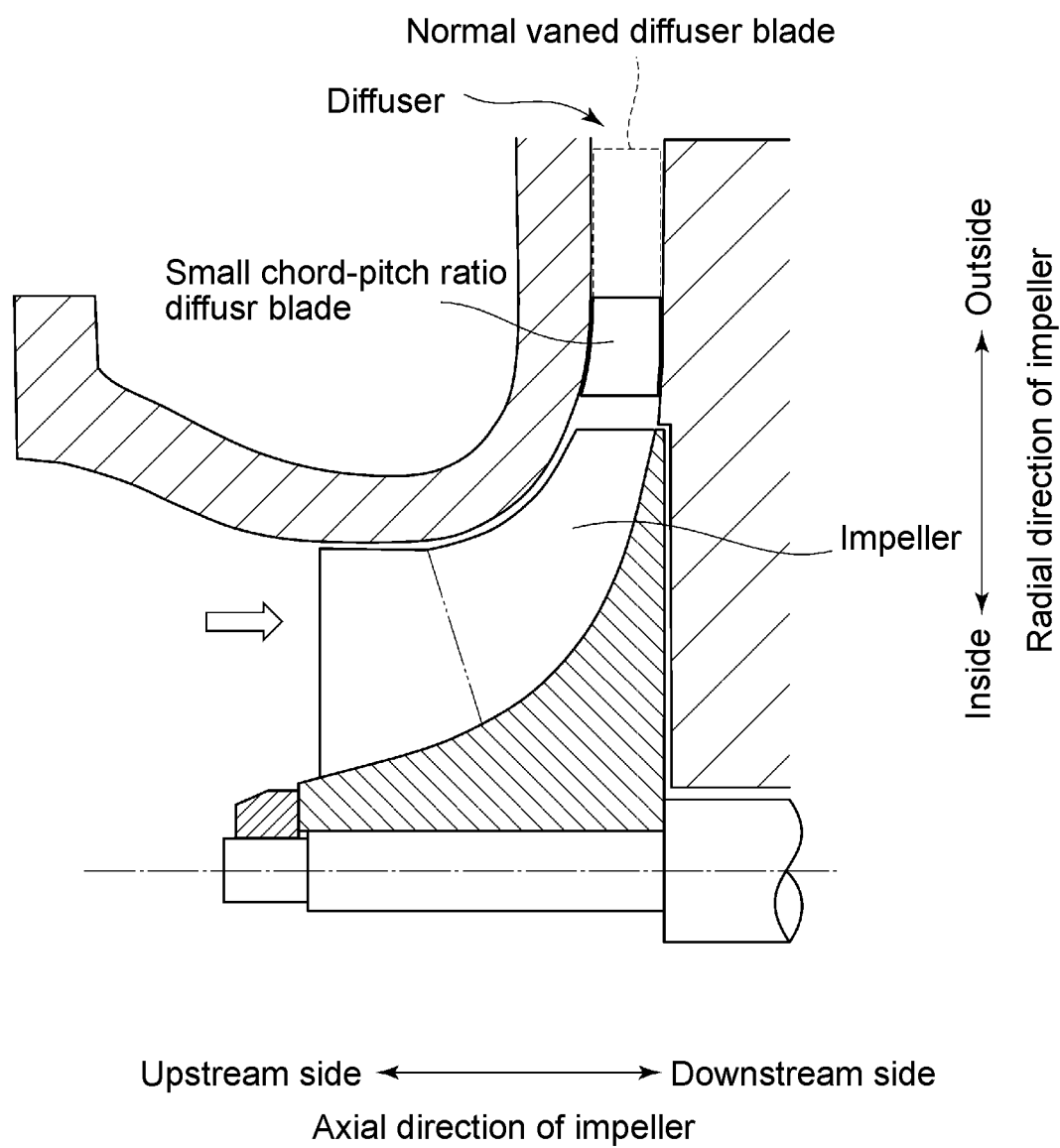
FIG. 22 is a meridional view showing a part of a typical centrifugal compressor with a vaned diffuser.

Further, in the above-described embodiments, the small chord-pitch ratio diffuser blades 16 include the flow passage dividing annulus 22. In a reference embodiment, however, as shown in FIGS. 20 and 21, for example, normal vaned diffuser blades 68 may include the flow passage dividing annulus 22. In the illustrative embodiment shown in FIGS. 20 and 21, the radially inner end 46 of the flow passage dividing annulus 22 is positioned inside of leading edges 70 of the normal vaned diffuser blades 68 in the radial direction, and the radially outer end 48 of the flow passage dividing annulus 22 is positioned outside of trailing edges 72 of the normal vaned diffuser blades 68 in the radial direction.

REFERENCE SIGNS LIST

2 Centrifugal compressor
4 Impeller
6 Rotational shaft
8 Turbocharger
10 Small chord-pitch ratio diffuser
12 Diffuser flow passage
14 Diffuser flow passage forming portion
16 Small chord-pitch ratio diffuser blade
18 Hub-side flow passage
20 Shroud-side flow passage
22 Flow passage dividing annulus
24 Shroud casing
26 Shroud-side flow passage wall portion
27, 31, 34, 36 Wall surface
28 Bearing casing
30 Hub-side flow passage wall portion
32 Suction surface
38, 70 Leading edge
39, 72 Trailing edge
40 Flow-passage-wall-side engagement portion
42 Diffuser-blade-side engagement portion
44 End surface
46 Radially inner end
47 Hub
48 Radially outer end
49 Impeller blade
50 Radially inner end portion
52 Radially outer end portion
54 Hub-side end
56 Shroud-side end
58, 60, 62, 64 Corner R portion
66 Curved surface shape
68 Vaned diffuser blade

The invention claimed is:
1. A centrifugal compressor comprising:
an impeller;
a diffuser flow passage forming portion forming an annular diffuser flow passage on a downstream side of the impeller;
a plurality of small chord-pitch ratio diffuser blades disposed in the diffuser flow passage at intervals in a circumferential direction of the impeller; and
a flow passage dividing annulus extending to the diffuser flow passage along a radial direction of the impeller, and dividing the diffuser flow passage into a hub-side flow passage and a shroud-side flow passage,
wherein a curved corner R portion is formed in a corner portion between the suction surface of the small chord-pitch ratio diffuser blade and a wall surface of the flow passage dividing annulus.

2. The centrifugal compressor according to claim 1,
wherein the small chord-pitch ratio diffuser blades extend in an axial direction of the impeller from the hub-side flow passage to the shroud-side flow passage so as to intersect with the flow passage dividing annulus.

3. The centrifugal compressor according to claim 2,
wherein a blade angle at each leading edge of the small chord-pitch ratio diffuser blades is uniform from a hub-side end to a shroud-side end of the leading edge in the axial direction.

4. The centrifugal compressor according to claim 1,
wherein the flow passage dividing annulus is formed integrally with the plurality of small chord-pitch ratio diffuser blades,
wherein the small chord-pitch ratio diffuser blades each include a diffuser-vane-side engagement portion which engages with a flow-passage-wall-side engagement portion disposed on the diffuser flow passage forming portion, and wherein the diffuser-vane-side engagement portion engages with the flow-passage-wall-side engagement portion so that the flow passage dividing annulus is held in the diffuser flow passage.

5. A centrifugal compressor comprising:
an impeller;
a diffuser flow passage forming portion forming an annular diffuser flow passage on a downstream side of the impeller;
a plurality of small chord-pitch ratio diffuser blades disposed in the diffuser flow passage at intervals in a circumferential direction of the impeller; and
a flow passage dividing annulus extending to the diffuser flow passage along a radial direction of the impeller, and dividing the diffuser flow passage into a hub-side flow passage and a shroud-side flow passage,
wherein the flow passage dividing annulus is formed so as to satisfy $ZSi/ZHi > ZSo/ZHo$, where $ZSi$ is a flow-passage width of the shroud-side flow passage in an axial direction of the impeller at a position of a radially inner end of the flow passage dividing annulus, $ZHi$ is a flow-passage width of the hub-side flow passage in the axial direction at the position of the radially inner end of the flow passage dividing annulus, $ZSo$ is a flow-passage width of the shroud-side flow passage in the axial direction at a position of a radially outer end of the flow passage dividing annulus, and $ZHo$ is a flow-passage width of the hub-side flow passage in the axial direction at the position of the radially outer end of the flow passage dividing annulus.

6. The centrifugal compressor according to claim 1,
wherein a radially inner end of the flow passage dividing annulus is positioned inside of leading edges of the small chord-pitch ratio diffuser blades in the radial direction.

7. The centrifugal compressor according to claim 1,
wherein the radially inner end of the flow passage dividing annulus is positioned outside of leading edges of the small chord-pitch ratio diffuser blades in the radial direction.

8. The centrifugal compressor according to claim 1, wherein the radially outer end of the flow passage dividing annulus is positioned inside of trailing edges of the small chord-pitch ratio diffuser blades in the radial direction.

9. The centrifugal compressor according to claim 1, wherein the radially outer end of the flow passage dividing annulus is positioned outside of trailing edges of the small chord-pitch ratio diffuser blades in the radial direction.

10. The centrifugal compressor according to claim 1,
wherein a radially-inner-side end portion including the radially inner end of the flow passage dividing annulus is formed such that a thickness in an axial direction of the impeller increases outward in the radial direction.

11. The centrifugal compressor according to claim 1,
wherein a radially-outer-side end portion including the radially outer end of the flow passage dividing annulus is formed such that a thickness in an axial direction of the impeller increases inward in the radial direction.

12. The centrifugal compressor according to claim 1,
wherein a flow-passage width of the hub-side flow passage in at least a partial section including a position of the radially inner end in an axial direction of the impeller decreases toward a downstream side.

13. The centrifugal compressor according to claim 1,
wherein a flow-passage width of the shroud-side flow passage in at least a partial section including a position of the radially inner end in an axial direction of the impeller decreases toward a downstream side.

14. A turbocharger comprising:
the centrifugal compressor according to claim 1.

15. The centrifugal compressor according to claim 1,
wherein R dimension of the curved corner R portion falls within a range of 20% to 50% of a blade height of a blade height, which is divided by the flow passage dividing annulus, of the small chord-pitch ratio diffuser blade.

* * * * *